(12) United States Patent
Keshavan et al.

(10) Patent No.: US 10,124,468 B2
(45) Date of Patent: *Nov. 13, 2018

(54) POLYCRYSTALLINE DIAMOND CONSTRUCTIONS HAVING IMPROVED THERMAL STABILITY

(75) Inventors: Madapusi K. Keshavan, The Woodlands, TX (US); Anthony Griffo, The Woodlands, TX (US); Yuelin Shen, Houston, TX (US); Youhe Zhang, Tomball, TX (US)

(73) Assignee: SMITH INTERNATIONAL, INC., Houston, TX (US)

( * ) Notice: Subject to any disclaimer, the term of this patent is extended or adjusted under 35 U.S.C. 154(b) by 743 days.

This patent is subject to a terminal disclaimer.

(21) Appl. No.: 12/399,369

(22) Filed: Mar. 6, 2009

(65) Prior Publication Data

US 2009/0173015 A1 Jul. 9, 2009

Related U.S. Application Data

(62) Division of application No. 12/026,398, filed on Feb. 5, 2008, now Pat. No. 8,028,771.

(Continued)

(51) Int. Cl.
*E21B 10/46* (2006.01)
*C04B 37/00* (2006.01)
(Continued)

(52) U.S. Cl.
CPC .............. *B24D 18/00* (2013.01); *B01J 3/062* (2013.01); *C04B 35/645* (2013.01);
(Continued)

(58) Field of Classification Search
CPC .......... B01J 2203/062; B01J 2203/0655; B01J 2203/0685; B01J 3/062; B24D 18/00;
(Continued)

(56) References Cited

U.S. PATENT DOCUMENTS 2,941,241 A 6/1960 Strong
2,941,248 A 6/1960 Hall
(Continued)

FOREIGN PATENT DOCUMENTS

CN 1968777 A 5/2007
EP 196777 A1 10/1986
(Continued)

OTHER PUBLICATIONS

Office Action issued in related U.S. Appl. No. 11/689,434; dated Jul. 20, 2010 (18 pages).
(Continued)

*Primary Examiner* — Shuangyi Abu Ali

(57) ABSTRACT

Polycrystalline diamond constructions include a diamond body comprising a matrix phase of bonded together diamond crystals formed at high pressure/high temperature conditions with a catalyst material. The sintered body is treated remove the catalyst material disposed within interstitial regions, rendering it substantially free of the catalyst material used to initially sinter the body. Accelerating techniques can be used to remove the catalyst material. The body includes an infiltrant material disposed within interstitial regions in a first region of the construction. The body includes a second region adjacent the working surface and that is substantially free of the infiltrant material. The infiltrant material can be a Group VIII material not used to initially sinter the diamond body. A metallic substrate is attached to the diamond body, and can be the same or different from a substrate used as a source of the catalyst material used to initially sinter the diamond body.

55 Claims, 5 Drawing Sheets

Related U.S. Application Data

(60) Provisional application No. 60/888,449, filed on Feb. 6, 2007, provisional application No. 60/941,616, filed on Jun. 1, 2007.

(51) Int. Cl.
| | |
|---|---|
| *B01J 3/06* | (2006.01) |
| *B24D 18/00* | (2006.01) |
| *C04B 35/645* | (2006.01) |
| *C04B 37/02* | (2006.01) |

(52) U.S. Cl.
CPC ....... *C04B 37/026* (2013.01); *B01J 2203/062* (2013.01); *B01J 2203/0655* (2013.01); *B01J 2203/0685* (2013.01); *C04B 2237/363* (2013.01); *C04B 2237/401* (2013.01); *C04B 2237/61* (2013.01); *Y10T 156/10* (2015.01); *Y10T 428/31678* (2015.04)

(58) Field of Classification Search
CPC ........ C04B 2237/363; C04B 2237/401; C04B 2237/61; C04B 35/645; C04B 37/026; Y10T 156/10
USPC .......................................................... 51/293
See application file for complete search history.

(56) References Cited

U.S. PATENT DOCUMENTS

| | | |
|---|---|---|
| 2,947,611 A | 8/1960 | Bundy |
| 3,136,615 A | 6/1964 | Bovenkerk et al. |
| 3,141,746 A | 7/1964 | Lai |
| 3,233,988 A | 2/1966 | Wentorf, Jr. et al. |
| 3,609,818 A | 10/1971 | Wentorf |
| 3,745,623 A | 7/1973 | Wentorf, Jr. et al. |
| 3,767,371 A | 10/1973 | Wentorf, Jr. et al. |
| 4,104,344 A | 8/1978 | Pope et al. |
| 4,108,614 A | 8/1978 | Mitchell |
| 4,151,686 A | 5/1979 | Lee et al. |
| 4,224,380 A | 9/1980 | Bovenkerk et al. |
| 4,255,165 A | 3/1981 | Dennis et al. |
| 4,268,276 A | 5/1981 | Bovenkerk |
| 4,288,248 A | 9/1981 | Bovenkerk et al. |
| 4,289,503 A | 9/1981 | Corrigan |
| 4,303,442 A | 12/1981 | Hara et al. |
| 4,311,490 A | 1/1982 | Bovenkerk et al. |
| 4,373,593 A | 2/1983 | Phaal et al. |
| 4,387,287 A | 6/1983 | Marazzi |
| 4,403,015 A | 9/1983 | Nakai et al. |
| 4,412,980 A | 11/1983 | Tsuji et al. |
| 4,481,016 A | 11/1984 | Campbell et al. |
| 4,486,286 A | 12/1984 | Lewin et al. |
| 4,504,519 A | 3/1985 | Zelez |
| 4,505,746 A | 3/1985 | Nakai et al. |
| 4,522,633 A | 6/1985 | Dyer |
| 4,525,178 A | 6/1985 | Hall |
| 4,525,179 A | 6/1985 | Gigl |
| 4,534,773 A | 8/1985 | Phaal et al. |
| 4,556,403 A | 12/1985 | Almond et al. |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall |
| 4,605,343 A | 8/1986 | Hibbs, Jr. et al. |
| 4,606,738 A | 8/1986 | Hayden |
| 4,621,031 A | 11/1986 | Scruggs |
| 4,629,373 A | 12/1986 | Hall |
| 4,636,253 A | 1/1987 | Nakai et al. |
| 4,645,977 A | 2/1987 | Kurokawa et al. |
| 4,662,348 A | 5/1987 | Hall et al. |
| 4,664,705 A * | 5/1987 | Horton et al. .................. 75/243 |
| 4,670,025 A | 6/1987 | Pipkin |
| 4,673,414 A | 6/1987 | Lavens et al. |
| 4,690,691 A | 9/1987 | Komanduri |
| 4,694,918 A | 9/1987 | Hall |
| 4,707,384 A | 11/1987 | Schachner et al. |
| 4,726,718 A | 2/1988 | Meskin et al. |
| 4,766,040 A | 8/1988 | Hillert et al. |
| 4,776,861 A | 10/1988 | Frushour |
| 4,784,023 A | 11/1988 | Dennis |
| 4,792,001 A | 12/1988 | Zijsling |
| 4,793,828 A | 12/1988 | Burnand |
| 4,797,241 A | 1/1989 | Peterson et al. |
| 4,802,539 A | 2/1989 | Hall et al. |
| 4,807,402 A | 2/1989 | Rai |
| 4,828,582 A | 5/1989 | Frushour |
| 4,844,185 A | 7/1989 | Newton, Jr. et al. |
| 4,850,523 A | 7/1989 | Slutz |
| 4,854,405 A | 8/1989 | Stroud et al. |
| 4,861,350 A | 8/1989 | Phaal et al. |
| 4,861,673 A | 8/1989 | Hara et al. |
| 4,871,377 A * | 10/1989 | Frushour ......................... 51/309 |
| 4,882,128 A | 11/1989 | Hukvari et al. |
| 4,899,922 A | 2/1990 | Slutz et al. |
| 4,919,220 A | 4/1990 | Fuller et al. |
| 4,931,068 A | 6/1990 | Dismukes et al. |
| 4,933,529 A | 6/1990 | Saville et al. |
| 4,940,180 A | 7/1990 | Martell |
| 4,943,488 A | 7/1990 | Sung et al. |
| 4,944,772 A | 7/1990 | Cho |
| 4,954,139 A | 9/1990 | Cerutti |
| 4,976,324 A | 12/1990 | Tibbitts |
| 4,984,642 A | 1/1991 | Renard et al. |
| 4,987,800 A | 1/1991 | Gasan et al. |
| 4,991,467 A | 2/1991 | Packer et al. |
| 5,011,514 A | 4/1991 | Cho et al. |
| 5,011,515 A | 4/1991 | Frushour |
| 5,027,912 A | 7/1991 | Juergens |
| 5,030,276 A | 7/1991 | Sung et al. |
| 5,032,147 A | 7/1991 | Frushour |
| 5,068,148 A | 11/1991 | Nakahara et al. |
| 5,092,687 A | 3/1992 | Hall |
| 5,096,465 A | 3/1992 | Chen et al. |
| 5,116,568 A | 5/1992 | Sung et al. |
| 5,127,923 A | 7/1992 | Bunting et al. |
| 5,135,061 A | 8/1992 | Newton, Jr. |
| 5,176,720 A | 1/1993 | Martell et al. |
| 5,186,725 A | 2/1993 | Martell et al. |
| 5,193,948 A | 3/1993 | Noggle et al. |
| 5,199,832 A | 4/1993 | Meskin et al. |
| 5,205,684 A | 4/1993 | Meskin et al. |
| 5,213,248 A | 5/1993 | Horton et al. |
| 5,238,074 A | 8/1993 | Tibbitts et al. |
| 5,264,283 A | 11/1993 | Waldenstrom et al. |
| 5,304,342 A | 4/1994 | Hall et al. |
| 5,337,844 A | 8/1994 | Tibbitts |
| 5,351,772 A | 10/1994 | Smith |
| 5,355,696 A | 10/1994 | Briggs |
| 5,355,969 A | 10/1994 | Hardy et al. |
| 5,369,034 A | 11/1994 | Hargett et al. |
| 5,370,195 A | 12/1994 | Keshavan et al. |
| 5,379,853 A | 1/1995 | Lockwood et al. |
| 5,439,492 A | 8/1995 | Anthony et al. |
| 5,464,068 A | 11/1995 | Najafi-Sani |
| 5,468,268 A | 11/1995 | Tank et al. |
| 5,469,927 A | 11/1995 | Griffin |
| 5,494,477 A | 2/1996 | Flood et al. |
| 5,496,638 A | 3/1996 | Waldenstrom et al. |
| 5,505,748 A | 4/1996 | Tank et al. |
| 5,510,193 A | 4/1996 | Cerutti et al. |
| 5,523,121 A | 6/1996 | Anthony et al. |
| 5,524,719 A | 6/1996 | Dennis |
| 5,560,716 A | 10/1996 | Tank et al. |
| 5,564,511 A | 10/1996 | Frushour |
| 5,603,070 A | 2/1997 | Cerutti et al. |
| 5,605,198 A | 2/1997 | Tibbitts et al. |
| 5,607,024 A | 3/1997 | Keith et al. |
| 5,620,382 A | 4/1997 | Cho et al. |
| 5,624,068 A | 4/1997 | Waldenstrom et al. |
| 5,645,617 A | 7/1997 | Frushour |
| 5,667,028 A | 9/1997 | Truax et al. |
| 5,718,948 A | 2/1998 | Ederyd et al. |
| 5,722,497 A | 3/1998 | Gum et al. |

(56) References Cited

U.S. PATENT DOCUMENTS

| | | |
|---|---|---|
| 5,722,499 A | 3/1998 | Nguyen et al. |
| 5,766,394 A | 6/1998 | Anderson et al. |
| 5,776,615 A | 7/1998 | Wong et al. |
| 5,780,139 A | 7/1998 | Eason et al. |
| 5,820,985 A | 10/1998 | Horton et al. |
| 5,833,021 A | 11/1998 | Mensa-Wilmot et al. |
| 5,853,873 A | 12/1998 | Setoyama et al. |
| 5,862,873 A | 1/1999 | Matthias et al. |
| 5,875,862 A | 3/1999 | Jurewicz et al. |
| 5,887,580 A | 3/1999 | Eyre |
| 5,889,219 A | 3/1999 | Otsuka et al. |
| 5,897,942 A | 4/1999 | Karner et al. |
| 5,906,245 A | 5/1999 | Tibbitts et al. |
| 5,954,147 A | 9/1999 | Overstreet et al. |
| 5,979,578 A | 11/1999 | Packer |
| 6,009,963 A | 1/2000 | Chaves et al. |
| 6,041,875 A | 3/2000 | Rai et al. |
| 6,054,693 A | 4/2000 | Barmatz et al. |
| 6,063,333 A | 5/2000 | Dennis |
| 6,068,913 A | 5/2000 | Cho et al. |
| 6,098,730 A | 8/2000 | Scott et al. |
| 6,106,585 A | 8/2000 | Rodriguez et al. |
| 6,123,612 A | 9/2000 | Goers |
| 6,126,741 A | 10/2000 | Jones et al. |
| 6,131,678 A | 10/2000 | Griffin |
| 6,132,675 A | 10/2000 | Corrigan et al. |
| 6,165,616 A | 12/2000 | Lemelson |
| 6,193,001 B1 | 2/2001 | Eyre et al. |
| 6,196,341 B1 | 3/2001 | Chaves et al. |
| 6,202,770 B1 | 3/2001 | Jurewicz et al. |
| 6,209,185 B1 | 4/2001 | Scott et al. |
| 6,216,805 B1 | 4/2001 | Lays et al. |
| 6,220,375 B1 | 4/2001 | Butcher et al. |
| 6,234,261 B1 | 5/2001 | Evans et al. |
| 6,248,447 B1 | 6/2001 | Griffin et al. |
| 6,258,139 B1 | 7/2001 | Jensen |
| 6,269,894 B1 | 8/2001 | Griffin |
| 6,298,930 B1 | 10/2001 | Sinor et al. |
| 6,302,225 B1 | 10/2001 | Yoshida et al. |
| 6,314,836 B1 | 11/2001 | Einset et al. |
| 6,315,065 B1 | 11/2001 | Yong et al. |
| 6,332,503 B1 | 12/2001 | Pessier et al. |
| 6,344,149 B1 | 2/2002 | Oles |
| 6,367,568 B2 | 4/2002 | Steinke et al. |
| 6,410,085 B1 | 6/2002 | Griffin et al. |
| 6,435,058 B1 | 8/2002 | Matthias et al. |
| 6,443,248 B2 | 9/2002 | Yong et al. |
| 6,447,560 B2 | 9/2002 | Pope et al. |
| 6,447,843 B1 | 9/2002 | Olson |
| 6,544,308 B2 | 4/2003 | Griffin et al. |
| 6,550,556 B2 | 4/2003 | Middlemiss et al. |
| 6,562,462 B2 | 5/2003 | Griffin et al. |
| 6,575,350 B2 | 6/2003 | Matthias et al. |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,662 B2 | 8/2003 | Matthias et al. |
| 6,605,798 B1 | 8/2003 | Cullen et al. |
| 6,641,861 B2 | 11/2003 | Imai et al. |
| 6,655,845 B1 | 12/2003 | Vail et al. |
| 6,739,214 B2 | 5/2004 | Griffin et al. |
| 6,744,024 B1 | 6/2004 | Hayes et al. |
| 6,749,033 B2 | 6/2004 | Griffin et al. |
| 6,797,326 B2 | 9/2004 | Griffin et al. |
| 6,830,598 B1 | 12/2004 | Sung et al. |
| 6,846,341 B2 | 1/2005 | Middlemiss |
| 6,852,414 B1 | 2/2005 | Frushour |
| 6,861,137 B2 | 3/2005 | Griffin et al. |
| 6,892,836 B1 | 5/2005 | Eyre |
| 6,904,984 B1 | 6/2005 | Estes et al. |
| 6,935,444 B2 | 8/2005 | Lund et al. |
| 6,991,049 B2 | 1/2006 | Eyre et al. |
| 7,077,867 B1 | 7/2006 | Pope et al. |
| 7,108,598 B1 | 9/2006 | Galloway et al. |
| 7,316,279 B2 | 1/2008 | Wiseman et al. |
| 7,350,601 B2 | 4/2008 | Belnap et al. |
| 7,377,341 B2 | 5/2008 | Middlemiss et al. |
| 7,464,973 B1 | 12/2008 | Chapman et al. |
| 7,464,993 B2 | 12/2008 | Hall et al. |
| 7,493,973 B2 | 2/2009 | Keshavan et al. |
| 7,517,589 B2 | 4/2009 | Eyre |
| 7,568,770 B2 | 8/2009 | Hall et al. |
| 7,635,035 B1 | 12/2009 | Bertagnolli et al. |
| 7,942,219 B2 | 5/2011 | Keshavan et al. |
| 8,002,859 B2 | 8/2011 | Griffo et al. |
| 8,028,771 B2 | 10/2011 | Keshavan et al. |
| 8,066,087 B2 | 11/2011 | Griffo et al. |
| 8,138,191 B2 | 3/2012 | Danter et al. |
| 8,172,012 B2 | 5/2012 | Achilles |
| 8,172,916 B2 | 5/2012 | Fujimura et al. |
| 8,236,074 B1 * | 8/2012 | Bertagnolli et al. ............ 51/307 |
| 8,328,891 B2 | 12/2012 | Zhang et al. |
| 8,567,531 B2 | 10/2013 | Belnap et al. |
| 8,771,389 B2 | 7/2014 | Keshavan et al. |
| 8,783,389 B2 | 7/2014 | Yu et al. |
| 2001/0008190 A1 | 7/2001 | Scott et al. |
| 2001/0030067 A1 | 10/2001 | Evans et al. |
| 2001/0054332 A1 | 12/2001 | Cheynet De Beaupre et al. |
| 2002/0034631 A1 | 3/2002 | Griffin et al. |
| 2002/0034632 A1 | 3/2002 | Griffin et al. |
| 2002/0045059 A1 | 4/2002 | Griffin et al. |
| 2002/0071729 A1 | 6/2002 | Middlemiss et al. |
| 2002/0084112 A1 | 7/2002 | Hall et al. |
| 2003/0235691 A1 | 12/2003 | Griffin et al. |
| 2004/0062928 A1 | 4/2004 | Raghavan et al. |
| 2004/0094333 A1 | 5/2004 | Yamamoto et al. |
| 2004/0105806 A1 | 6/2004 | Griffin et al. |
| 2004/0244540 A1 | 12/2004 | Oldham et al. |
| 2005/0050801 A1 | 3/2005 | Cho |
| 2005/0129950 A1 | 6/2005 | Griffin et al. |
| 2005/0133277 A1 | 6/2005 | Dixon |
| 2005/0210755 A1 | 9/2005 | Cho et al. |
| 2005/0230156 A1 * | 10/2005 | Belnap et al. ................. 175/375 |
| 2005/0262774 A1 | 12/2005 | Eyre et al. |
| 2005/0263328 A1 | 12/2005 | Middlemiss |
| 2006/0060390 A1 | 3/2006 | Eyre |
| 2006/0060392 A1 | 3/2006 | Eyre et al. |
| 2006/0110575 A1 | 5/2006 | Rosiwal et al. |
| 2006/0157285 A1 | 7/2006 | Cannon et al. |
| 2006/0162969 A1 | 7/2006 | Belnap et al. |
| 2006/0165993 A1 | 7/2006 | Keshavan |
| 2006/0191723 A1 | 8/2006 | Keshavan |
| 2006/0207802 A1 | 9/2006 | Zhang et al. |
| 2006/0247769 A1 | 11/2006 | Molz et al. |
| 2006/0266558 A1 | 11/2006 | Middlemiss et al. |
| 2006/0266559 A1 | 11/2006 | Keshavan et al. |
| 2006/0283639 A1 | 12/2006 | Yong et al. |
| 2007/0029114 A1 | 2/2007 | Middlemiss |
| 2007/0079994 A1 | 4/2007 | Middlemiss |
| 2007/0169419 A1 | 7/2007 | Davis et al. |
| 2007/0181348 A1 | 8/2007 | Tank et al. |
| 2007/0187155 A1 | 8/2007 | Middlemiss |
| 2008/0029310 A1 | 2/2008 | Stevens et al. |
| 2008/0085407 A1 | 4/2008 | Cooley et al. |
| 2008/0115421 A1 | 5/2008 | Sani |
| 2008/0142276 A1 | 6/2008 | Griffo |
| 2008/0178535 A1 | 7/2008 | Wan et al. |
| 2008/0185189 A1 | 8/2008 | Griffo et al. |
| 2008/0206576 A1 | 8/2008 | Qian et al. |
| 2008/0223621 A1 | 9/2008 | Middlemiss et al. |
| 2008/0223623 A1 | 9/2008 | Keshavan et al. |
| 2008/0230280 A1 | 9/2008 | Keshavan et al. |
| 2008/0240879 A1 | 10/2008 | Dourfaye et al. |
| 2008/0250723 A1 | 10/2008 | Fragiacomo |
| 2008/0302579 A1 | 12/2008 | Keshavan et al. |
| 2009/0032169 A1 | 2/2009 | Dourfaye et al. |
| 2009/0090563 A1 | 4/2009 | Voronin et al. |
| 2009/0133938 A1 | 5/2009 | Hall et al. |
| 2009/0152017 A1 | 6/2009 | Shen et al. |
| 2009/0152018 A1 | 6/2009 | Sani |
| 2009/0173015 A1 | 7/2009 | Keshavan et al. |
| 2009/0226688 A1 | 9/2009 | Fang |
| 2009/0313908 A1 | 12/2009 | Zhang et al. |
| 2010/0012389 A1 | 1/2010 | Zhang et al. |

(56) References Cited

U.S. PATENT DOCUMENTS

| | | |
|---|---|---|
| 2010/0015140 A1 | 1/2010 | Danter et al. |
| 2010/0181117 A1 | 7/2010 | Scott |
| 2010/0281782 A1 | 11/2010 | Keshavan et al. |
| 2010/0294571 A1 | 11/2010 | Belnap et al. |
| 2010/0320006 A1 | 12/2010 | Fan et al. |
| 2011/0023375 A1 | 2/2011 | Sani et al. |
| 2011/0247278 A1 | 10/2011 | Keshavan et al. |
| 2012/0222364 A1 | 9/2012 | Lyons et al. |
| 2012/0225277 A1 | 9/2012 | Scott et al. |
| 2013/0291442 A9 | 11/2013 | Zhang et al. |
| 2014/0290146 A1 | 10/2014 | Fan et al. |
| 2016/0229031 A1 | 8/2016 | Shen et al. |

FOREIGN PATENT DOCUMENTS

| | | |
|---|---|---|
| EP | 246789 A2 | 11/1987 |
| EP | 291314 A2 | 11/1988 |
| EP | 0300699 | 1/1989 |
| EP | 0329954 | 8/1989 |
| EP | 0329954 A2 | 8/1989 |
| EP | D329954 A2 | 8/1989 |
| EP | 300699 A3 | 1/1990 |
| EP | 352811 A1 | 1/1990 |
| EP | 0500253 | 8/1992 |
| EP | 500253 A1 | 8/1992 |
| EP | 0543461 A2 | 5/1993 |
| EP | 585631 A1 | 3/1994 |
| EP | 0595630 | 5/1994 |
| EP | 0612868 | 8/1994 |
| EP | 0617207 | 9/1994 |
| EP | 0714695 A2 | 6/1996 |
| EP | 0787820 | 8/1997 |
| EP | 595630 B1 | 1/1998 |
| EP | 612868 B1 | 7/1998 |
| EP | 0860515 | 8/1998 |
| EP | 1036913 A1 | 9/2000 |
| EP | 1064991 A2 | 1/2001 |
| EP | 1116858 | 7/2001 |
| EP | 1190791 | 3/2002 |
| EP | 1958688 | 8/2008 |
| EP | 1958688 A1 | 8/2008 |
| EP | 2032243 A1 | 3/2009 |
| GB | 1349385 | 4/1974 |
| GB | 2048927 | 12/1980 |
| GB | 2048927 B | 3/1983 |
| GB | 2190412 A | 11/1987 |
| GB | 2204625 A | 11/1988 |
| GB | 2261894 A | 6/1993 |
| GB | 2268768 | 1/1994 |
| GB | 2270492 A | 3/1994 |
| GB | 2270493 | 3/1994 |
| GB | 2268768 B | 1/1996 |
| GB | 2323398 | 9/1998 |
| GB | 2345710 A | 7/2000 |
| GB | 2351747 | 1/2001 |
| GB | 2367081 | 3/2002 |
| GB | 2408735 | 6/2005 |
| GB | 2408735 A | 6/2005 |
| GB | 2413575 | 11/2005 |
| GB | 2413813 A | 11/2005 |
| GB | 2418215 | 3/2006 |
| GB | 2418215 A | 3/2006 |
| GB | 2422623 | 8/2006 |
| GB | 2427215 | 12/2006 |
| GB | 2429471 | 2/2007 |
| GB | 2429717 B | 3/2007 |
| GB | 2429727 | 3/2007 |
| GB | 2438073 | 11/2007 |
| GB | 2447776 | 9/2008 |
| GB | 2 455 425 A | 6/2009 |
| GB | 2429471 B | 7/2009 |
| JP | 60187603 | 10/1984 |
| JP | 59219500 | 12/1984 |
| JP | S59-219500 A | 12/1984 |
| JP | S59219500 A | 12/1984 |
| JP | S60187603 A | 9/1985 |
| JP | 2003291036 A | 10/2003 |
| WO | 9323204 | 11/1993 |
| WO | 9634131 | 10/1996 |
| WO | 9846344 A1 | 10/1998 |
| WO | 00/28106 A1 | 5/2000 |
| WO | 0028106 | 5/2000 |
| WO | 0198978 A1 | 12/2001 |
| WO | 2003091586 | 6/2003 |
| WO | 2004040095 | 5/2004 |
| WO | 2004106003 | 12/2004 |
| WO | 2004106004 | 12/2004 |
| WO | 2007042920 | 4/2007 |
| WO | 2008/063568 A1 | 5/2008 |
| WO | 2009051022 A2 | 4/2009 |
| WO | 2010098978 A1 | 9/2010 |
| WO | 2010148313 A2 | 12/2010 |

OTHER PUBLICATIONS

US Office Action issued in related U.S. Appl. No. 12/026,525 dated Sep. 17, 2010 (11 pages).
Notice of Allowance issued in related U.S. Appl. No. 11/689,434; dated Jan. 6, 2011 (11 pages).
US Office Action issued in U.S. Appl. No. 111689,434 dated Jun. 5, 2009 (10 pages).
UK Search Report issued in Application No. GB0805168.2 dated Jul. 17, 2008 (4 pages).
EP Communication issued in Application No. 08101339.3 dated Jan. 15, 2009 (8 pages).
British Examination Report issued in related British Application No. GB0805168.2; dated Aug. 9, 2011 (2 pages).
U.S. Office Action issued in U.S. Appl. No. 11/689,434, dated Jan. 19, 2010 (15 pages).
Restriction Requirement in U.S. Appl. No. 12/026,398 dated Dec. 30, 2008, total 4 pages.
UK Examination Report issued in Application No. GB0916520.0 dated Oct. 23, 2009 (2 pages).
UK Search Report issued in Application No. GB0916520.0 dated Oct. 23, 2009 (2 pages).
US Office Action issued in U.S. Appl. No. 12/026,398 dated Nov. 20, 2009 (12 pages).
Combined Search and Examination Report under Sections 17 and 18(3) dated Jul. 15, 2010 by the UK Intellectual Property Office in corresponding application No. GB1010841.3 (4 pages).
Nonfinal Office Action in U.S. Appl. No. 12/026,398 dated Mar 13, 2009, total 9 pages.
Notice of Allowance issued in related U.S. Appl. No. 12/026,398; dated Jun. 27, 2011 (20 pages).
US Office Action issued in corresponding U.S. Appl. No. 13/155,043 dated Oct. 2, 2012 (7 pages).
UK Examination Report issued in Application No. GB0805168.2 dated May 4, 2012 (3 pages).
UK Search and Examination Report issued in Application No. GB1206076.0 dated May 4, 2012 (4 pages).
UK Examination Report issued in Application No. GB1206076.0 dated Jun. 26, 2012 (1 page).
Examination Report issued in corresponding Canadian Application No. 2,619,547; dated Oct. 20, 2014 (2 pages).
Examination Report issued in corresponding Canadian Application No. 2,619,547; dated Jan. 29, 2014 (4 pages).
Office Action issued in corresponding European Application No. 08101339.3 dated Feb. 7, 2013 (7pages).
Office Action for CA App No. 2588331, dated Jan. 8, 2014, 2 pages.
Office Action for CA App No. 2588331, dated Apr. 19, 2013, 3 pages.
Office Action for corresponding Canadian App No. 2619526, dated Apr. 29, 2011, 2 pages.
Office Action for corresponding Canadian App No. 2619526, dated Sep. 30, 2009, 3 pages.
Voluntary Amendment issued for related Canadian App No. 2619526, dated Apr. 29, 2011, 2 pages.

(56) References Cited

OTHER PUBLICATIONS

Office Action for CN App No. 200980127904.8, dated Feb. 5, 2013, 15 pages.
Office Action for CN App No. 200980127904.8, dated Aug. 1, 2014, 8 pages.
Office Action for CN App No. 200980127904.8, dated Oct. 31, 2013, 8 pages.
Office Action for CN App No. 200980127904.8, dated Dec. 10, 2014, 7 pages.
Examination Report issued in related GB App No. 0708915.4, dated Jun. 30, 2010, 1 page.
Examination Report issued in related GB App No. 0708915.4, dated Dec. 6, 2010, 5 pages.
Search Report for GB App No. 0708915.4, dated Aug. 16, 2007, 1 page.
Combined Search and Examination Report for corresponding GB App No. 0802233.7, dated May 19, 2008, 2 pages.
Extended European Search Report for corresponding EP App No. 08101339.3, dated Jul. 1, 2008, 8 pages.
Examination Report for corresponding GB App No. 0820881.1, dated Jun. 18, 2012, 2 pages.
Examination Report for corresponding GB App No. 0820881.1, dated Aug. 23, 2011, 4 pages.
Examination Report for corresponding GB App No. 0820881.1, dated Dec. 13, 2011, 4 pages.
Search Report for corresponding GB App No. 0820881.1, dated Jan. 5, 2009, 2 pages.
Combined Search and Examination Report for corresponding GB App No. 0916520.0, dated Oct. 23, 2009, 2 pages.
Examination Report for related GB App No. 1101214.3, dated Jan. 27, 2012, 3 pages.
Examination Report for GB 1206076.0, dated Jul. 19, 2012, 3 pages.
Combined Search and Examination Report for corresponding GB App No. 1210470.9, dated Jun. 29, 2012, 5 pages.
International Search Report and Written Opinion for PCT/US2009/051022, dated Feb. 24, 2010, 7 pages.
International Search Report for corresponding International App No. PCT/US2009/051047, dated Feb. 24, 2010, 3 pages.
Written Opinion for corresponding International App No. PCT/US2009/051047, dated Feb. 24, 2010, 5 pages.
International Search Report issued in International App. No. PCT/US2010/033936, dated Jan. 14, 2011, 4 pages.
Written Opinion issued in International App. No. PCT/US2010/033936, dated Jan. 14, 2011, 5 pages.
Final Office Action issued in U.S. Appl. No. 11/689,434, dated Jan. 19, 2010, 8 pages.
US Office Action issued in related U.S. Appl. No. 12/026,525, dated Sep. 17, 2010, 10 pages.
Non-Final Office Action in U.S. Appl. No. 12/505,297, dated Feb. 18, 2015, 9 pages.
Non-Final Office Action issued in related U.S. Appl. No. 12/505,316, dated Dec. 27, 2010, 9 pages.
Third-Party Submission Under 37 C.F.R. 1.99 for U.S. Appl. No. 12/505,316, filed Feb. 19, 2010, 9 pages.
Third-Party Submission Under 37 C.F.R. 1.99 for U.S. Appl. No. 12/505,316, filed Feb. 8, 2010, 3 pages.
Third-Party Submission Under 37 C.F.R. 1.99 for U.S. Appl. No. 12/505,316, filed Jan. 21, 2010, 3 pages.
Radke et al., Faster Drilling, Longer Life: Thermally Stable Diamond Drill Bit Cutters; 2004 GasTIPS.
Translation of Japanese Unexamined Patent Application No. S59-218500, "Diamond Sintering and Processing Method," Shuji Yatsu and Tetsuo Nakai, inventors, application published Dec. 10, 1984, Applicant: Sumitomo Electric Industries, Co. Ltd., 10 pages.
First Office Action issued in Chinese application No. 201080036092.9 dated Nov. 29, 2013, 8 pages.
International Preliminary Report on Patentability issued in International application No. PCT/US2009/051022 dated Jan. 18, 2011, 5 pages.
International Preliminary Report on Patentability issued in International application No. PCT/US2009/051047 dated Jan. 18, 2011, 6 pages.
International Preliminary Report on Patentability issued in International application No. PCT/US2010/033936 dated Nov. 9, 2011, 6 pages.
International Search Report and Written Opinion issued in International application No. PCT/US2010/039184 dated Jan. 26, 2011, 6 pages.
International Preliminary Report on Patentability issued in International application No. PCT/US2010/039184 dated Dec. 20, 2011, 4 pages.
Office Action issued in U.S. Appl. No. 11/745,726 dated Sep. 1, 2010, 13 pages.
Office Action issued in U.S. Appl. No. 11/745,726, dated Mar. 12, 2010, 16 pages.
Office Action issued in U.S. Appl. No. 11/958,314 dated Mar. 2, 2010, 11 pages.
Office Action issued in U.S. Appl. No. 11/958,314 dated Aug. 18, 2010, 9 pages.
Final Office Action issued in U.S. Appl. No. 11/958,314 dated Apr. 25, 2011, 10 pages.
Office Action issued in U.S. Appl. No. 11/958,314 dated Jun. 17, 2013, 9 pages.
Final Office Action issued in U.S. Appl. No. 11/958,314 dated Dec. 2, 2013, 19 pages.
Office Action issued in U.S. Appl. No. 11/958,314 dated Feb. 4, 2015, 17 pages.
Office Action issued in U.S. Appl. No. 12/505,297 dated Mar. 8, 2012, 11 pages.
Final Office Action issued in U.S. Appl. No. 12/505,297 dated Aug. 17, 2012, 8 pages.
Office Action issued in U.S. Appl. No. 12/505,297 dated Feb. 18, 2015, 17 pages.
Final Office Action issued in U.S. Appl. No. 12/505,297 dated Sep. 16, 2015, 19 pages.
Final Office Action issued in U.S. Appl. No. 12/505,297 dated Jul. 15, 2016, 22 pages.
Office Action issued in U.S. Appl. No. 12/775,420 dated May 9, 2012, 38 pages.
Final Office Action issued in U.S. Appl. No. 12/775,420 dated Jan. 15, 2013, 50 pages.
Office Action issued in U.S. Appl. No. 12/775,420 dated May 1, 2013, 40 pages.
Final Office Action issued in U.S. Appl. No. 12/775,420 dated Dec. 6, 2013, 18 pages.
Office Action issued in U.S. Appl. No. 12/818,780 dated Nov. 1, 2012, 9 pages.
Office Action issued in U.S. Appl. No. 12/818,780 dated Mar. 28, 2013, 11 pages.
Office Action issued in U.S. Appl. No. 12/818,780 dated Oct. 31, 2013, 11 pages.
Office Action issued in U.S. Appl. No. 13/671,019 dated Feb. 5, 2016, 8 pages.
Office Action issued in U.S. Appl. No. 13/925,320 dated Nov. 20, 2014, 9 pages.
Office Action issued in U.S. Appl. No. 13/925,320 dated May 20, 2015, 25 pages.
Office Action issued in U.S. Appl. No. 14/301,906 dated Mar. 17, 2017, 16 pages.
Office Action issued in U.S. Appl. No. 15/083,281, dated Oct. 16, 2017, 9 pages.
Office Action issued in U.S. Appl. No. 12/026,398, dated Mar. 13, 2009, 9 pages.
Office Action issued in U.S. Appl. No. 12/026,398, dated Nov. 20, 2009, 12 pages.
Search Report issued in GB Patent Application No. 0805168.2, dated Jul. 17, 2008, 4 pages.
Examination Report issued in GB Patent Application No. 0805168.2, dated Jan. 27, 2012, 2 pages.

(56) References Cited

OTHER PUBLICATIONS

Dr. Shin-Ichiro Takasu, Influence of Solvent Types on the Characteristics of Synthetic Diamonds, Toshiba Central Research Laboratory, Kawasaki, JP, as published in Science and Technology of Industrial Diamonds, vol. II, edited by John Burls, 1966.
Examination Report issued in GB Patent Application No. 1121675.1, dated Jul. 18, 2013, 2 pages.
Office Action issued in U.S. Appl. No. 13/085,089, dated Feb. 5, 2013, 9 pages.
Reply to Office Action filed in U.S. Appl. No. 13/085,089, dated May 1, 2013, 14 pages.
Office Action issued in U.S. Appl. No. 13/085,089, dated Jul. 17, 2013, 9 pages.
Reply to Office Action filed in U.S. Appl. No. 13/085,089, dated Sep. 17, 2013, 12 pages.
Advisory Action issued in U.S. Appl. No. 13/085,089, dated Oct. 2, 2013, 3 pages.
Reply to Advisory Action filed in U.S. Appl. No. 13/085,089, dated Dec. 17, 2013, 18 pages.
Office Action issued in U.S. Appl. No. 13/085,089, dated Jul. 2, 2015, 8 pages.
Reply to Office Action filed in U.S. Appl. No. 13/085,089, dated Oct. 29, 2015, 7 pages.
Office Action issued in U.S. Appl. No. 13/085,089, dated Jan. 6, 2016, 7 pages.
Appeal Brief filed in US. Appl. No. 13/085,089, dated Feb. 6, 2017, 90 pages.

\* cited by examiner

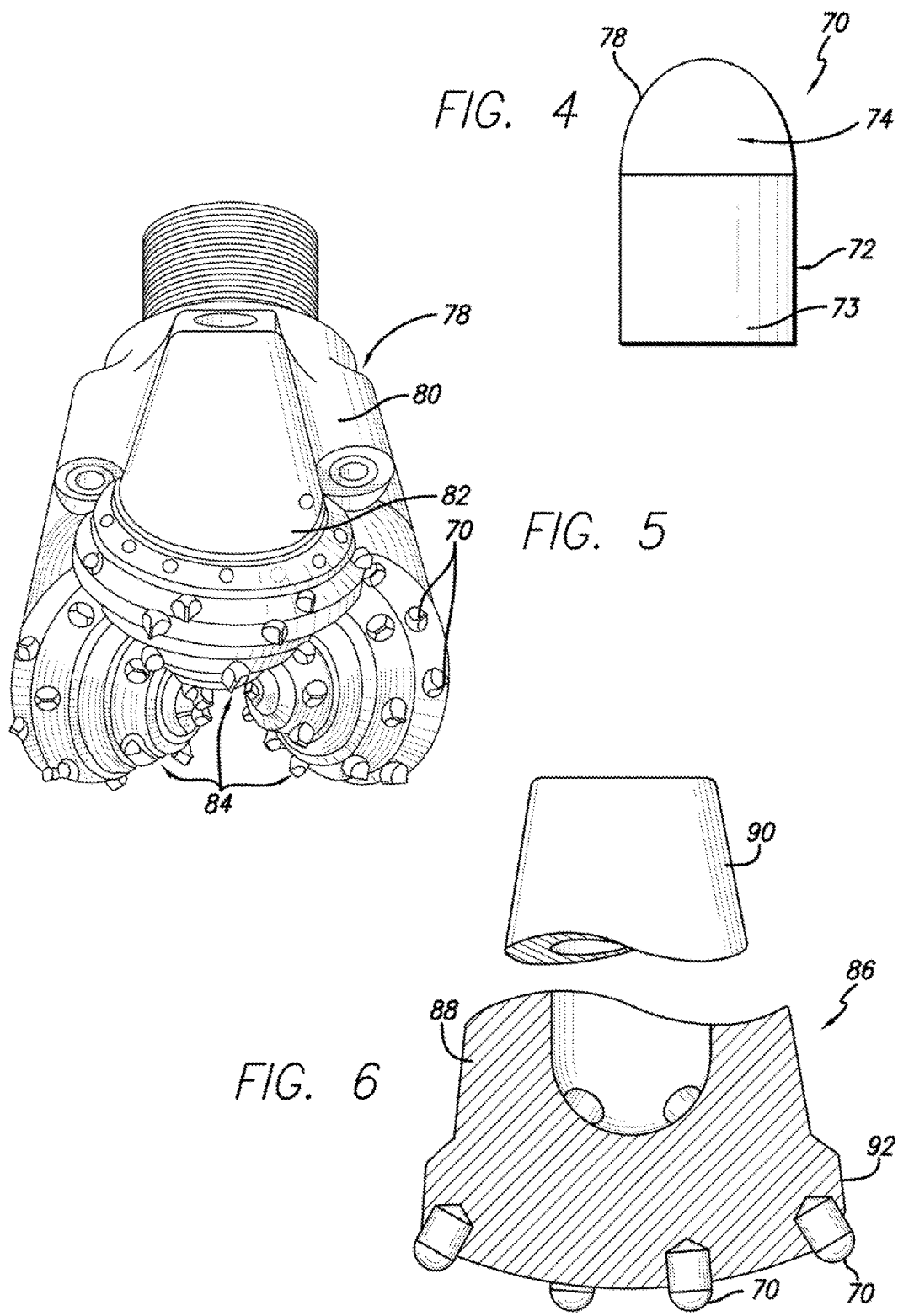

POLYCRYSTALLINE DIAMOND CONSTRUCTIONS HAVING IMPROVED THERMAL STABILITY

CROSS-REFERENCE TO RELATED APPLICATIONS

This patent application is a divisional application of U.S. patent application Ser. No. 12/026,398 filed on Feb. 5, 2008, which claims benefit of U.S. Provisional Patent Application Nos. 60/888,449 filed on Feb. 6, 2007, and 60/941,616 filed on Jun. 1, 2007, all of which are incorporated herein by reference in their entirety.

FIELD OF THE INVENTION

This invention relates to polycrystalline diamond constructions, and methods for forming the same, that are specially engineered having differently composed regions for the purpose of providing improved thermal characteristics when used, e.g., as a cutting element or the like, during cutting and/or wear applications when compared to conventional PCD comprising the solvent catalyst material used to form the same.

BACKGROUND OF THE INVENTION

The existence and use polycrystalline diamond material types for forming tooling, cutting and/or wear elements is well known in the art. For example, polycrystalline diamond (PCD) is known to be used as cutting elements to remove metals, rock, plastic and a variety of composite materials. Such known polycrystalline diamond materials have a microstructure characterized by a polycrystalline diamond matrix first phase, that generally occupies the highest volume percent in the microstructure and that has the greatest hardness, and a plurality of second phases, that are generally filled with a solvent catalyst material used to facilitate the bonding together of diamond grains or crystals together to form the polycrystalline matrix first phase during sintering.

PCD known in the art is formed by combining diamond grains (that will form the polycrystalline matrix first phase) with a suitable solvent catalyst material (that will form the second phase) to form a mixture. The solvent catalyst material can be provided in the form of powder and mixed with the diamond grains or can be infiltrated into the diamond grains during high pressure/high temperature (HPHT) sintering. The diamond grains and solvent catalyst material is sintered at extremely high pressure/high temperature process conditions, during which time the solvent catalyst material promotes desired intercrystalline diamond-to-diamond bonding between the grains, thereby forming a PCD structure.

Solvent catalyst materials used for forming conventional PCD include solvent metals from Group VIII of the Periodic table, with cobalt (Co) being the most common. Conventional PCD can comprise from about 85 to 95% by volume diamond and a remaining amount being the solvent metal catalyst material. The solvent catalyst material is present in the microstructure of the PCD material within interstices or interstitial regions that exist between the bonded together diamond grains and/or along the surfaces of the diamond crystals.

The resulting PCD structure produces enhanced properties of wear resistance and hardness, making PCD materials extremely useful in aggressive wear and cutting applications where high levels of wear resistance and hardness are desired. Industries that utilize such PCD materials for cutting, e.g., in the form of a cutting element, include automotive, oil and gas, aerospace, nuclear and transportation to mention only a few.

For use in the oil production industry, such PCD cutting elements are provided in the form of specially designed cutting elements such as shear cutters that are configured for attachment with a subterranean drilling device, e.g., a shear or drag bit. Thus, such PCD shear cutters are used as the cutting elements in shear bits that drill holes in the earth for oil and gas exploration. Such shear cutters generally comprise a PCD body that is joined to substrate, e.g., a substrate that is formed from cemented tungsten carbide. The shear cutter is manufactured using an HPHT process that generally utilizes cobalt as a catalytic second phase material that facilitates liquid-phase sintering between diamond particles to form a single interconnected polycrystalline matrix of diamond with cobalt dispersed throughout the matrix.

The shear cutter is attached to the shear bit via the substrate, usually by a braze material, leaving the PCD body exposed as a cutting element to shear rock as the shear bit rotates. High forces are generated at the PCD/rock interface to shear the rock away. In addition, high temperatures are generated at this cutting interface, which shorten the cutting life of the PCD cutting edge. High temperatures incurred during operation cause the cobalt in the diamond matrix to thermally expand and even change phase (from BCC to FCC), which thermal expansion is known to cause the diamond crystalline bonds within the microstructure to be broken at or near the cutting edge, thereby also operating to reduces the life of the PCD cutter. Also, in high temperature oxidizing cutting environments, the cobalt in the PCD matrix will facilitate the conversion of diamond back to graphite, which is also known to radically decrease the performance life of the cutting element.

Attempts in the art to address the above-noted limitations have largely focused on the solvent catalyst material's degradation of the PCD construction by catalytic operation, and removing the catalyst material therefrom for the purpose of enhancing the service life of PCD cutting elements. For example, it is known to treat the PCD body to remove the solvent catalyst material therefrom, which treatment has been shown to produce a resulting diamond body having enhanced cutting performance. One known way of doing this involves at least a two-stage technique of first forming a conventional sintered PCD body, by combining diamond grains and a solvent catalyst material and subjecting the same to HPHT process as described above, and then removing the solvent catalyst material therefrom, e.g., by acid leaching process.

Known approaches include removing substantially all of the solvent catalyst material from the PCD body so that the remaining PCD body comprises essential a matrix of diamond bonded crystals with no other material occupying the interstitial regions between the diamond crystals. While the so-formed PCD body may display improved thermal properties, it now lacks toughness that may make it unsuited for particular high-impact cutting and/or wear applications. Additionally, it is difficult to attach such so-formed PCD bodies to substrates to form a PCD compact. The construction of a compact having such a substrate is desired because it enables attachment of the PCD cutter to a cutting and/or wear device by conventional technique, such as welding, brazing or the like. Without a substrate, the so-formed PCD body must be attached to the cutting and/or wear device by interference fit, which is not practical and does not provide a strong attachment to promote a long service life.

It is, therefore, desirable that a polycrystalline diamond construction be engineered in a manner that not only has improved thermal characteristics to provide an improved degree of thermal stability when compared to conventional PCD, but that does so in a manner that avoids unwanted deterioration of the PCD body that is known to occur by the presence of the solvent catalyst material initially used to form the PCD construction at or near the working surface. It is further desired that such polycrystalline diamond constructions be engineered in a manner that enables the attachment of a substrate thereto, thereby forming a thermally stable polycrystalline diamond compact that facilitates attachment of the polycrystalline diamond compact to cutting and/or wear devices by conventional method, such as by welding, brazing, or the like.

SUMMARY OF THE INVENTION

Polycrystalline diamond constructions prepared according to principles of this invention comprise a diamond body having a material microstructure comprising a matrix phase of bonded together diamond crystals. The diamond bonded matrix phase is formed at high pressure/high temperature conditions in the presence of a catalyst material. The diamond body has a surface, e.g., a working surface that can be any surface of the diamond body, and includes interstitial regions disposed between the diamond crystals. The diamond body has been treated so that the interstitial regions previously occupied by the catalyst material after sintering are empty such that the interstitial regions are substantially free of the catalyst material used to initially sinter and form the diamond body.

The diamond body comprises a first region that includes an infiltrant material. The infiltrant material can be a Group VIII material and is disposed within the interstitial regions. In an example embodiment, the first region of the diamond body is positioned remote from a diamond body surface, e.g., a working surface. The diamond body includes a second region that is positioned adjacent the first region, and that extends a depth from the diamond body surface, e.g., a working surface. The second region comprises interstitial regions that are substantially free of the infiltrant material. In an example embodiment, the second region extends a depth from one or more surfaces of the body including top, beveled and/or side surfaces.

The polycrystalline diamond construction can include a substrate that is attached to the diamond body. In an example embodiment, the substrate can be attached to the diamond body adjacent the first region. The substrate that is ultimately attached to the diamond body can be made from the same or different material as that which may have been used as a source of the catalyst material during the initial process of forming the diamond bonded matrix phase.

Such polycrystalline diamond constructions can be made by subjecting diamond grains to a high pressure/high temperature condition in the presence of a catalyst material to form the polycrystalline diamond material comprising the matrix phase of bonded together diamond grains and interstitial regions disposed between the diamond grains including the catalyst material. The so-formed sintered diamond material is treated to remove the catalyst material therefrom, producing a diamond body that is substantially free of the catalyst material used to initially form the polycrystalline diamond material. An infiltrant material is introduced into the diamond body, filling at least a population of the otherwise empty interstitial regions resulting from the removal of the catalyst material. It is desired that a region of the diamond body remain substantially free of the infiltrant material. A metallic substrate can then be attached to the diamond body.

Polycrystalline diamond constructions, prepared according to principles of this invention being substantially free of the catalyst material used to initially form the diamond body, display properties of improved thermal stability when compared to conventional PCD. Further, polycrystalline diamond constructions of this invention, comprising a region that includes an infiltrant material, permit formation of a compact comprising a substrate that facilitates attachment with end-use cutting, wearing, and machine devices for desired end-use applications by conventional methods such as by welded or brazed attachment.

BRIEF DESCRIPTION OF THE DRAWINGS

These and other features and advantages of the present invention will be appreciated as the same becomes better understood by reference to the following detailed description when considered in connection with the accompanying drawings wherein:

FIG. 4 is a perspective side view of an insert, for use in a roller cone or a hammer drill bit, comprising polycrystalline diamond constructions of this invention;

FIG. 5 is a perspective side view of a roller cone drill bit comprising a number of the inserts of FIG. 4;

FIG. 6 is a perspective side view of a percussion or hammer bit comprising a number of inserts of FIG. 4;

DETAILED DESCRIPTION

Figure 1A:
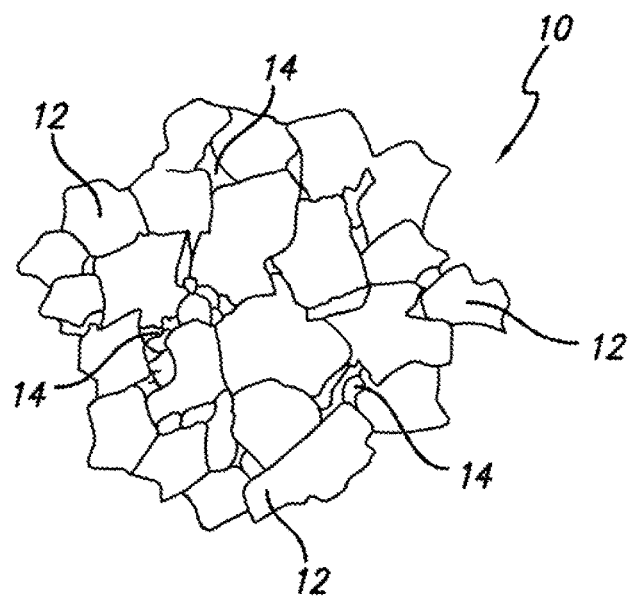
FIG. 1A is a schematic view of a region taken from a polycrystalline diamond body comprising an infiltrant material disposed interstitially between bonded together diamond crystals.

Polycrystalline diamond constructions of this invention have a material microstructure comprising a polycrystalline matrix first phase that is formed from bonded together diamond grains or crystals. The diamond body further includes interstitial regions disposed between the diamond crystals, wherein in one region of the body the interstitial regions are filled with an infiltrant material that was not used to initially form the diamond body, and wherein in another region of the body the interstitial regions are substantially free of the infiltrant material. The construction can additionally comprise one or more substrate that is attached to the diamond body, thereby forming a compact construction.

Such polycrystalline diamond constructions and compacts configured in this matter are specially engineered to provide improved thermal characteristics such as thermal stability when exposed to cutting and wear applications when compared to conventional PCD materials, i.e., those that are formed from and that include the catalyst material, e.g., a solvent metal catalyst, that was initially used to form the diamond body. Polycrystalline diamond constructions of this invention, comprising a substrate attached thereto, facilitate attachment of the construction to desired tooling, cutting, machining, and/or wear devices, e.g., a drill bit used for drilling subterranean formations.

As used herein, the term "polycrystalline diamond" refers to a material that has been formed at high pressure/high temperature (HPHT) conditions that has a material microstructure comprising a matrix phase of bonded-together diamond crystals and that is substantially free of the catalyst material that was used to initially form the matrix diamond phase. The material microstructure further includes a plurality of interstitial regions that are disposed between the diamond crystals. Polycrystalline diamond constructions of this invention can be formed by conventional method of subjecting precursor diamond grains or powder to HPHT sintering conditions in the presence of a catalyst material, e.g., a solvent metal catalyst, that functions to facilitate the bonding together of the diamond grains at temperatures of between about 1,350 to 1,500° C., and pressures of 5,000 Mpa or higher. Suitable catalyst materials useful for making PCD include those metals identified in Group VIII of the Periodic table.

As used herein, the term "thermal characteristics" is understood to refer to characteristics that impact the thermal stability of the resulting polycrystalline construction, which can depend on such factors as the relative thermal compatibilities such as thermal expansion properties, of the materials occupying the different construction material phases.

A feature of polycrystalline constructions of this invention is that they comprise a diamond body that retains the matrix phase of bonded together diamond crystals, but the body has been modified so that it no longer includes the catalyst material that was used during the sintering process to initially form the body of bonded diamonds and that remains from that sintering process. Rather, the diamond body has been specially treated so that such catalyst material is removed from the interstitial regions of the diamond body. The diamond body is subsequently treated so that the empty interstitial regions in one region comprise an infiltrant material, while the interstitial regions in another region remain empty or are substantially free of the infiltrant material.

As used herein, the term "infiltrant material" is understood to refer to materials that are other than the catalyst material that was used to initially form the diamond body, and can include materials identified in Group VIII of the Periodic table that have subsequently been introduced into the sintered diamond body after the catalyst material used to form the same has been removed therefrom. Additionally, the term "infiltrant material" is not intended to be limiting on the particular method or technique use to introduce such material into the already formed diamond body.

FIG. 1A schematically illustrates a region 10 of a polycrystalline diamond construction prepared according to principles of this invention that includes the infiltrant material. Specifically, the region 10 includes a material microstructure comprising a plurality of bonded together diamond crystals 12, forming an intercrystalline diamond matrix first phase, and the infiltrant material 14 that is interposed within the plurality of interstitial regions that exist between the bonded together diamond crystals and/or that are attached to the surfaces of the diamond crystals. For purposes of clarity, it is understood that the region 10 of the polycrystalline construction is one taken from a diamond body after it has been modified in accordance with this invention to remove the catalyst material that was used to initially form the diamond body.

Figure 1B:
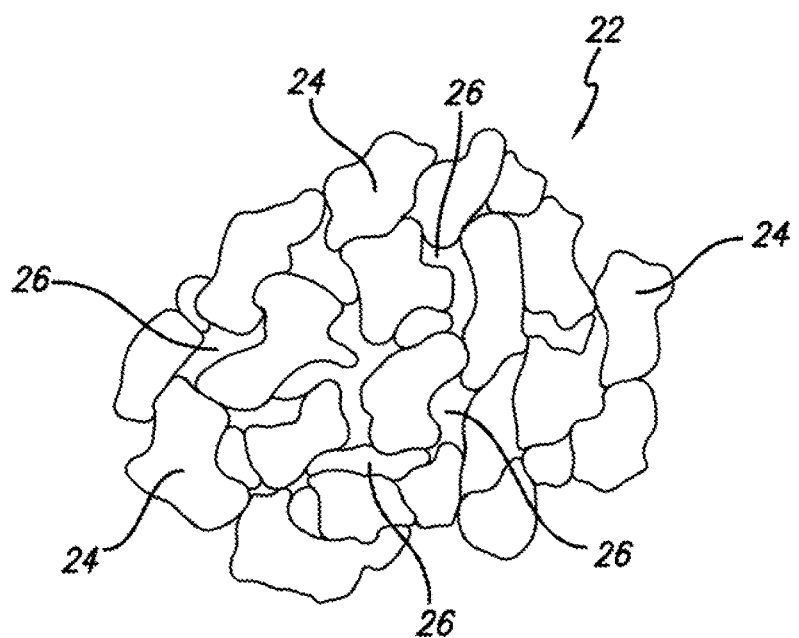
FIG. 1B is a schematic view of a region taken from a polycrystalline diamond body that is substantially free of the infiltrant material of FIG. 1.

FIG. 1B schematically illustrates a region 22 of a polycrystalline diamond construction prepared according to principles of this invention that is substantially free of the infiltrant material. Like the polycrystalline diamond construction region illustrated in FIG. 1A, the region 22 includes a material microstructure comprising the plurality of bonded together diamond crystals 24, forming the intercrystalline diamond matrix first phase. Unlike the region 10 illustrated in FIG. 1A, this region of the diamond body 22 has been modified to remove the infiltrant material from the plurality of interstitial regions and, thus comprises a plurality of interstitial regions 26 that are substantially free of the infiltrant material. Again, it is understood that the region 22 of the polycrystalline diamond construction is one taken from a diamond body after it has been modified according to principles of this invention to remove the catalyst material that was used to initially form the diamond body therefrom.

Polycrystalline diamond constructions of this invention are provided in the form of a diamond body that may or may not be attached to a substrate. The diamond body may be configured to include the two above-described regions in the form of two distinct portions of the body, or the diamond body can be configured to include the two above-described regions in the form of discrete elements that are positioned at different locations within the body, depending on the particular end-use application.

Polycrystalline diamond constructions configured in this manner, lacking the catalyst material used to initially form the diamond body and that is further modified to include the two regions described above, provide improved thermal characteristics to the resulting material microstructure when compared to conventional PCD comprising the catalyst material that was used to initially form the diamond body.

Figure 2A:
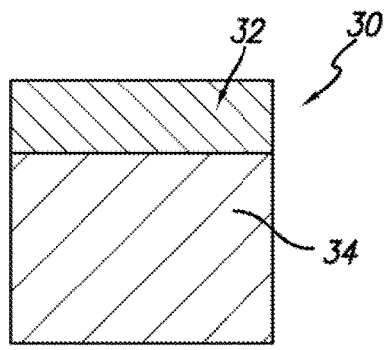
FIGS. 2A to 2H are cross-sectional schematic side views of polycrystalline diamond constructions of this invention during different stages of formation.
Figure 2B:
Figure 2C:
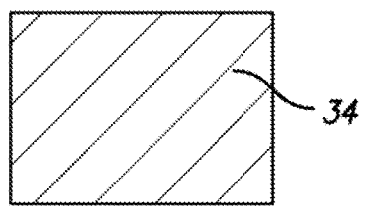

FIGS. 2A, 2B, and 2C each schematically illustrate an example embodiment polycrystalline diamond construction 30 of this invention at different stages of formation. FIG. 2A illustrates a first stage of formation, starting with a conventional PCD body 32 in its initial form after sintering by conventional HPHT sintering process. At this early stage, the PCD body 32 comprises a polycrystalline diamond matrix phase and a solvent catalyst metal material, such as cobalt, used to form the diamond matrix phase and that is disposed within the interstitial regions between the bonded together diamond crystals forming the matrix phase. The solvent catalyst metal material can be added to the precursor diamond grains or powder as a raw material powder prior to sintering, it can be contained within the diamond grains or powder, or it can be infiltrated into the diamond grains or powder during the sintering process from a substrate containing the solvent metal catalyst material and that is placed adjacent the diamond powder and exposed to the HPHT sintering conditions. In an example embodiment, the solvent metal catalyst material is provided as an infiltrant from a substrate 34, e.g., a WC—Co substrate, during the HPHT sintering process.

Diamond grains useful for forming the PCD body include synthetic or natural diamond powders having an average diameter grain size in the range of from submicrometer in size to 100 micrometers, and more preferably in the range of from about 1 to 80 micrometers. The diamond powder can contain grains having a mono or multi-modal size distribution. In the event that diamond powders are used having differently sized grains, the diamond grains are mixed together by conventional process, such as by ball or attritor milling for as much time as necessary to ensure good uniform distribution.

As noted above, the diamond powder may be combined with a desired solvent metal catalyst powder to facilitate diamond bonding during the HPHT process and/or the solvent metal catalyst can be provided by infiltration from a substrate positioned adjacent the diamond powder during the HPHT process. Suitable solvent metal catalyst materials useful for forming the PCD body include those metals selected from Group VIII elements of the Periodic table. A particularly preferred solvent metal catalyst is cobalt (Co).

Alternatively, the diamond powder mixture can be provided in the form of a green-state part or mixture comprising diamond powder that is contained by a binding agent, e.g., in the form of diamond tape or other formable/confirmable diamond mixture product to facilitate the manufacturing process. In the event that the diamond powder is provided in the form of such a green-state part it is desirable that a preheating step take place before HPHT consolidation and sintering to drive off the binder material. In an example embodiment, the PCD body resulting from the above-described HPHT process may have a diamond volume content in the range of from about 85 to 95 percent. For certain applications, a higher diamond volume content up to about 98 percent may be desired.

The diamond powder or green-state part is loaded into a desired container for placement within a suitable HPHT consolidation and sintering device. In an example embodiment, where the source of the solvent metal catalyst material is provided by infiltration from a substrate, a suitable substrate material is disposed within the consolidation and sintering device adjacent the diamond powder mixture. In a preferred embodiment, the substrate is provided in a preformed state. Substrates useful for forming the PCD body can be selected from the same general types of materials conventionally used to form substrates for conventional PCD materials, including carbides, nitrides, carbonitrides, ceramic materials, metallic materials, cermet materials, and mixtures thereof. A feature of the substrate used for forming the PCD body is that it includes a solvent metal catalyst capable of melting and infiltrating into the adjacent volume of diamond powder to facilitate conventional diamond-to-diamond intercrystalline bonding forming the PCD body. A preferred substrate material is cemented tungsten carbide (WC—Co).

Where the solvent metal catalyst is provided by infiltration from a substrate, the container including the diamond power and the substrate is loaded into the HPHT device and the device is then activated to subject the container to a desired HPHT condition to effect consolidation and sintering of the diamond powder. In an example embodiment, the device is controlled so that the container is subjected to a HPHT process having a pressure of 5,000 Mpa or more and a temperature of from about 1,350° C. to 1,500° C. for a predetermined period of time. At this pressure and temperature, the solvent metal catalyst melts and infiltrates into the diamond powder, thereby sintering the diamond grains to form conventional PCD.

While a particular pressure and temperature range for this HPHT process has been provided, it is to be understood that such processing conditions can and will vary depending on such factors as the type and/or amount of solvent metal catalyst used in the substrate, as well as the type and/or amount of diamond powder used to form the PCD body or region. After the HPHT process is completed, the container is removed from the HPHT device, and the assembly comprising the bonded together PCD body and substrate is removed from the container. Again, it is to be understood that the PCD body can be formed without using a substrate if so desired.

FIG. 2B schematically illustrates an example embodiment polycrystalline diamond construction 30 of this invention after a second stage of formation, specifically at a stage where the solvent catalyst material used to initially form the diamond body and disposed in the interstitial regions and/or attached to the surface of the bonded together diamond crystals has been removed form the diamond body 32. At this stage of making the construction, the diamond body has a material microstructure resembling region 22 that is illustrated in FIG. 1B, comprising the diamond matrix phase formed from a plurality of bonded together diamond crystals 24, and interstitial regions 26 that are substantially free of the specific catalyzing material, e.g., cobalt, that was used during the sintering process to initially form the body of bonded diamonds and that remains from that sintering process used to initially form the diamond matrix phase.

As used herein, the term "removed" is used to refer to the reduced presence of the specific catalyst material in the diamond body that was used to initially form the diamond body during the sintering or HPHT process, and is understood to mean that a substantial portion of the catalyst material no longer resides within the diamond body. However, it is to be understood that some small trace amounts of the catalyst material may still remain in the microstructure of the diamond body within the interstitial regions and/or adhered to the surface of the diamond crystals. Additionally, the term "substantially free", as used herein to refer to the remaining diamond body after the specific catalyst material used to form it during sintering has been removed, is understood to mean that there may still be some trace small amounts of the specific metal catalyst remaining within the diamond body as noted above.

The quantity of the specific catalyst material used to form the diamond body remaining in the material microstructure after the diamond body has been subjected to treatment to remove the same can and will vary on such factors as the efficiency of the removal process, and the size and density of the diamond matrix material. In an example embodiment, the catalyst material used to form the diamond body is removed therefrom by a suitable process, such as by chemical treatment such as by acid leaching or aqua regia bath, electrochemically such as by electrolytic process, by liquid metal solubility technique, by liquid metal infiltration technique that sweeps the existing second phase material away and replaces it with another during a liquid-phase sintering process, or by combinations thereof. In an example embodiment, the catalyst material is removed from all or a desired region of the PCD body by an acid leaching technique, such as that disclosed for example in U.S. Pat. No. 4,224,380, which is incorporated herein by reference.

Accelerating techniques for removing the catalyst material can also be used, and can be used in conjunction with the leaching techniques noted above as well as with other conventional leaching processing. Such accelerating techniques include elevated pressures, elevated temperatures and/or ultrasonic energy, and can be useful to decrease the amount of treatment time associated with achieving the same level of catalyst removal, thereby improving manufacturing efficiency.

In one embodiment, the leaching process can be accelerated by conducting the same under conditions of elevated pressure that may be greater than about 5 bar, and that may range from about 10 to 50 bar in other embodiments. Such elevated pressure conditions can be achieved by conducting the leaching process in a pressure vessel or the like. It is to be understood that the exact pressure condition can and will vary on such factors as the leaching agent that is used as well as the materials and sintering characteristics of the diamond body.

In addition to elevated pressure, elevated temperatures can also be used for the purpose of accelerating the leaching process. Suitable temperature levels may be in the range of from about 90 to 350° C. in one embodiment, and up to 175 to 225° C. in another embodiment. In one or more embodiments, elevated temperature levels may range up to 300° C. It is to be understood that the exact temperature condition can and will vary on such factors as the leaching agent that is used as well as the materials and sintering characteristics of the diamond body. It is to be understood that the accelerating technique can include elevated pressure in conjunction with elevated temperature, which would involve the use of a pressure assembly capable of producing a desired elevated temperature, e.g., by microwave heating or the like. For example, a microwave-transparent pressure vessel can be issued to implement the accelerated leaching process. Alternatively, the accelerating technique can include elevated temperature or elevated pressure, i.e., one or the other and not a combination of the two.

Ultrasonic energy can be used as an accelerating technique that involves providing vibratory energy operating at frequencies beyond audible sound, e.g., at frequencies of about 18,000 cycles per second and greater. A converter or piezoelectronic transducer can be used for form a desired ultrasonic stack for this purpose, wherein the piezoelectric crystals are used to convert electrical charges to desired acoustic energy, i.e., ultrasonic energy. Boosters can be used to modify the amplitude of the mechanical vibration, and a sontotrode or horn can be used to apply the vibration energy. The use of ultrasonic energy can produce an 80 to 90 percent increase in leaching depth as a function of time as compared to leaching without using ultrasonic energy, thereby providing a desired decrease in leaching time and an improvement in manufacturing efficiency.

Referring again to FIG. 2B, at this stage of the process any substrate 34 that was used as a source of the catalyst material can be removed from the diamond body 32, and/or may fall away from the diamond body during the process of catalyst material removal. In an example embodiment, it may be desired to remove the substrate from the diamond body before treatment to facilitate the catalyst removal process, e.g., so that all surfaces of the diamond body can be exposed for the purpose of catalyst material removal. If the catalyst material was mixed with or otherwise provided with the precursor diamond powder, then the polycrystalline construction 30 at this stage of manufacturing will not contain a substrate, i.e., it will only consist of a diamond body 32.

FIG. 2C schematically illustrates an example embodiment polycrystalline construction 30 prepared according to principles of this invention after a third stage of formation. Specifically, at a stage where the catalyst material used to initially form the diamond body has been removed therefrom and has been replaced with a desired infiltrant material. In the example embodiment noted above, the infiltrant material can be selected from the group of materials including metals, ceramics, cermets, and combinations thereof. In an example embodiment, the infiltrant material is a metal or metal alloy selected from Group VIII of the Periodic table, such as cobalt, nickel, iron or combinations thereof. It is to be understood that the choice of material or materials used as the infiltrant material can and will vary depending on such factors including but not limited to the end-use application, and the type and density of the diamond grains used to form the polycrystalline diamond matrix first phase, and the mechanical properties and/or thermal characteristics desired for the polycrystalline diamond construction.

Referring back to FIG. 2B, once the catalyst material used to initially form the diamond body is removed from the diamond body, the remaining microstructure comprises a polycrystalline matrix phase with a plurality of interstitial voids 26 forming what is essentially a porous material microstructure. This porous microstructure not only lacks mechanical strength, but also lacks a material constituent that is capable of forming a strong attachment bond with a substrate, e.g., in the event that the polycrystalline diamond construction needs to be in the form of a compact comprising such a substrate to facilitate attachment to an end-use device.

The voids or pores in the polycrystalline diamond body can be filled with the infiltrant material using a number of different techniques. Further, all of the voids or only a portion of the voids in the diamond body can be filled with the replacement material. In an example embodiment, the infiltrant material can be introduced into the diamond body by liquid-phase sintering under HPHT conditions. In such example embodiment, the infiltrant material can be provided in the form of a sintered part or a green-state part that contains the infiltrant material and that is positioned adjacent one or more surfaces of the diamond body. The assembly is placed into a container that is subjected to HPHT conditions sufficient to melt the infiltrant material within the sintered part or green-state part and cause it to infiltrate into the diamond body. In an example embodiment, the source of the infiltrant material can be a substrate that will be used to form a compact from the polycrystalline diamond construction by attachment to the diamond body during the HPHT process.

Alternatively, rather than using a substrate as a source of the infiltrant material, the diamond body can be encapsulated with a desired power mixture, e.g., one formed from one or more materials that can be sintered to provide a material that is attached to the diamond body and that has desired properties to facilitate use of the resulting sintered polycrystalline diamond construction in a cutting and/or wear application. For example, the powder mixture can comprise a WC—co/alloy. When subjected to HPHT conditions, the cobalt in such powder mixture will melt and infiltrate into the diamond body from all directions. Additionally, any remaining material outside of the diamond body may be sintered and attached to the diamond body.

Alternatively, the infiltrant material can be introduced into the PCD body by pressure technique where the infiltrant material is provided in the form of a slurry or the like comprising a desired infiltrant material with a carrier, e.g., such as a polymer or organic carrier. The slurry is then exposed to the diamond body at high pressure to cause it to enter the diamond body and cause the infiltrant material to fill the voids therein. The PCD body can then be subjected to elevated temperature for the purpose of removing the carrier therefrom, thereby leaving the replacement material disposed within the interstitial regions.

The term "filled", as used herein to refer to the presence of the infiltrant material in the voids or pores of the diamond body that resulted from removing the catalyst material used to form the diamond body therefrom, is understood to mean that a substantial volume of such voids or pores contain the infiltrant material. However, it is to be understood that there may also be a volume of voids or pores within the same region of the diamond body that do not contain the infiltrant material, and that the extent to which the infiltrant material effectively displaces the empty voids or pores will depend on such factors as the particular microstructure of the diamond body, the effectiveness of the process used for introducing the infiltrant material, and the desired mechanical and/or thermal properties of the resulting polycrystalline diamond construction. In a preferred embodiment, when introduced into the diamond body, the infiltrant substantially fills all of the voids or pores within the diamond body. In some embodiments, complete migration of the infiltrant material through the diamond body may not be realized, in which case a region of the diamond body may not include the infiltrant material. This region devoid of the infiltrant material from such incomplete migration may extend from the region comprising the infiltrant to a surface portion of the diamond body.

In an example embodiment, a substrate is used as the source of the infiltrant material and to form the polycrystalline construction. Substrates useful in this regard can include substrates that are used to form conventional PCD, e.g., those formed from metals, ceramics, and/or cermet materials that contain a desired infiltrant. In an example embodiment, the substrate is formed from WC—Co, and is positioned adjacent the diamond body after the metal catalyst material used to initially form the same been removed, and the assembly is subjected to HPHT conditions sufficient to cause the cobalt in the substrate to melt and infiltrate into and fill the voids or pores in the polycrystalline diamond matrix.

The substrate used as a source for the infiltrant material can have a material make up and/or performance properties that are different from that of a substrate used to provide the catalyst material for the initial sintering of the diamond body. For example, the substrate selected for sintering the diamond body may comprise a material make up that facilitates diamond bonding, but that may have poor erosion resistance and as a result not be well suited for an end-use application in a drill bit. In this case, the substrate selected at this stage for providing the source of the infiltrant can be selected from materials different from that of the sintering substrate, e.g., from materials capable of providing improved down hole properties such as erosion resistance when attached to a drill bit. Accordingly, it is to be understood that the substrate material selected as the infiltrant source can be different from the substrate material used to initially sinter the diamond body.

In an example embodiment, wherein a PCD material is treated to remove the solvent metal catalyst material, Co, used to initially form the same therefrom, the resulting diamond body was subjected to further HPHT processing for a period of approximately 100 seconds at a temperature sufficient to meet the melting temperature of the infiltrant material, which was cobalt. The source of the cobalt infiltrant material was a WC—Co substrate that was positioned adjacent a desired surface portion of the diamond body prior to HPHT processing. The HPHT process was controlled to bring the contents to the melting temperature of cobalt (about 1,350° C., at a pressure of about 3,400 to 7,000 Mpa) to enable the cobalt to infiltrate into and fill the pores or voids in the diamond body. During the HPHT process, the substrate containing the cobalt material was attached to the diamond body to thereby form a polycrystalline diamond compact construction.

In addition to the representative processes for introducing the infiltrant material into the voids or pores of the diamond body, other processes can be used for introducing the infiltrant material. These processes include, but are not limited to chemical processes, electrolytic processes, and by electro-chemical processes.

FIG. 2C illustrates the diamond body 32 at a stage when it is filled with the infiltrant material, wherein the diamond body is free standing. However, as mentioned above, it is to be understood that the diamond body 32 filled with the infiltrant material at this stage of processing can be in the form of a compact construction comprising a substrate attached thereto. The substrate can be attached during the HPHT process used to fill the diamond body with the infiltrant material. Alternatively, the substrate can be attached separately from the HPHT process used for filling, such as by a separate HPHT process, or by other attachment technique such as brazing or the like.

Once the diamond body 32 has been filled with the infiltrant material, it is then treated to remove a portion of the infiltrant material therefrom. Alternatively, if the infiltrant material did not migrate completely through the diamond body, a subsequent infiltrant removal step may not be necessary, or may useful as a clean up process to ensure a uniform infiltrant removal depth.

FIGS. 2D, 2E, 2F and 2G all illustrate representative embodiments of diamond bodies that have been filled with the infiltrant material and subsequently treated to remove the infiltrant material from a region therefrom. Techniques useful for removing a portion of the infiltrant material from the diamond body includes the same ones described above for removing the catalyst material used to initially form the diamond body from the PCD material, e.g., during the second step of processing such as by acid leaching or the like. In an example embodiment, it is desired that the process of removing the infiltrant material be controlled so that the infiltrant material be removed from a targeted region of the diamond body extending a determined depth from one or more diamond body surfaces. These surfaces may include working and/or nonworking surfaces of the diamond body.

In an example embodiment, the infiltrant material is removed from the diamond body a depth of less than about 0.5 mm from the desired surface or surfaces, and preferably in the range of from about 0.05 to 0.4 mm. Ultimately, the specific depth of the region formed in the diamond body by removing the infiltrant material will vary depending on the particular end-use application.

Figure 2D:
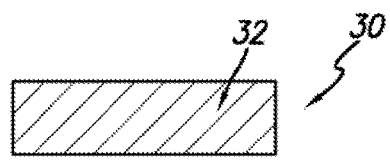

FIG. 2D illustrates an embodiment of the polycrystalline diamond construction 30 comprising the diamond body 32 that includes a first region 36 that is substantially free of the infiltrant material, and a second region 38 that includes the infiltrant material. The first region 36 extends a depth from surfaces 40 and 42 of the PCD body, and the second region 38 is remote from the surfaces 40 and 42. In this particular embodiment, the surfaces include a top surface 40 and side surfaces 42 of the diamond body. The depth of the first regions can be the same or different for the surfaces 40 and 42 depending on the particular end-use application. Additionally, the extent of the side surfaces that include the first region can vary from extending along the entire side of the diamond body to extending only along a partial length of the side of diamond body.

Figure 2E:
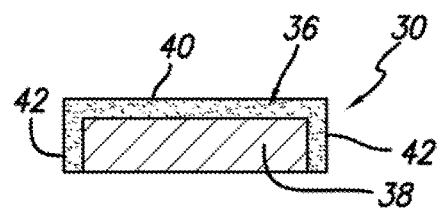

FIG. 2E illustrates an embodiment of the polycrystalline diamond construction 30 that is similar to that illustrated in FIG. 2D, except that it includes a beveled or chamfered surface 44 that is positioned along an edge of the diamond body 32, between the top surface 40 and the side surface 42, and that includes the first region. The beveled surface can be formed before or after the PCD body has been treated to form the first region 36. In a preferred embodiment, the beveled region is formed before the PCD body has been treated to form the first region, e.g., by OD grinding or the like.

Figure 2F:
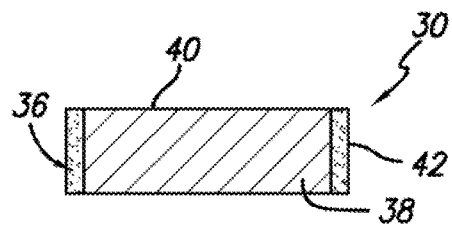

FIG. 2F illustrates another embodiment of the polycrystalline diamond construction 30 of this invention that is similar to that illustrated in FIG. 2D, except that the first region 36 is positioned only along the side surface 42 of the diamond body 32 and not along the top surface 40. Thus, in this particular embodiment, the first region is in the form of an annular region that surrounds the second region 38. Again, it is to be understood that the placement position of the first region relative to the second region can and will vary depending on the particular end-use application.

Figure 2G:
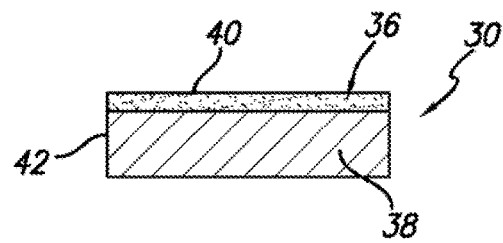

FIG. 2G illustrates another embodiment of the polycrystalline diamond construction 30 of this invention that is similar to that illustrated in FIG. 2D except that the first region 36 is positioned only along the top surface 40 of the diamond body 32 and not along the side surface 42. Thus, in this particular embodiment, the first region is in the form of a disk-shaped region on top of the second region 38.

Figure 2H:
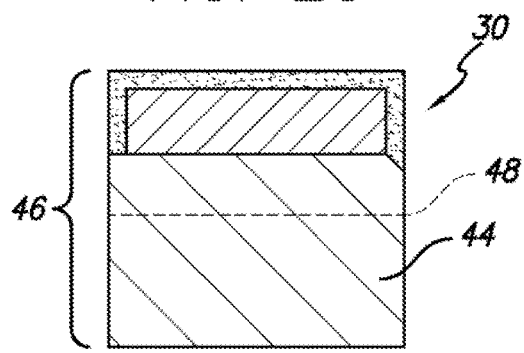
Figure 3:
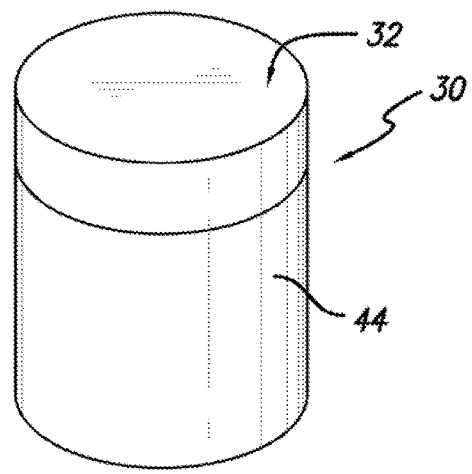
FIG. 3 is a schematic side view of an example embodiment polycrystalline diamond compact construction of this invention comprising a substrate.

FIG. 2H illustrates an embodiment of the polycrystalline construction 30 comprising the diamond body 32 as illustrated in FIG. 2D attached to a desired substrate 44, thereby forming a polycrystalline diamond compact construction 46. As noted above, the substrate 44 can be attached to the diamond body 32 during the HPHT process that is used during the third step of making the polycrystalline diamond construction, e.g., to introduce the infiltrant material into the diamond body. Alternatively, the infiltrant material can be added to the diamond body independent of a substrate, in which case the desired substrate can be attached to the diamond body by either a further HPHT process or by brazing, welding, or the like. FIG. 3 illustrates a side view of the polycrystalline diamond construction 30 of FIG. 2H, provided in the form of a compact comprising the diamond body 32 attached to the substrate 44.

In an example embodiment, the substrate used to form the polycrystalline diamond compact construction is formed from a cermet material, such as that conventionally used to form a PCD compact. In a preferred embodiment, when the substrate is used as the source of the replacement material, the substrate is formed from a cermet, such as a WC, further comprising a binder material that is the infiltrant material used to fill the diamond body. Suitable binder materials include Group VIII metals of the Periodic table or alloys thereof, and/or Group IB metals of the Periodic table or alloys thereof, and/or other metallic materials.

Although the substrate may be attached to the diamond body during the infiltrant material introduction, it is also understood that the substrate may be attached to the diamond body after the desired infiltrant material has been introduced. In such case, infiltrant material can be introduced into the diamond body by a HPHT process that does not use the substrate material as a source, and the desired substrate can be attached to the diamond body by a separate HPHT process or other method, such as by brazing, welding or the like. The substrate can further be attached to the diamond body before or after the infiltrant material has been partially removed therefrom.

If desired, an intermediate material can be interposed between the substrate and the diamond body. The intermediate material can be formed from those materials that are capable of forming a suitable attachment bond between both the diamond body and the substrate. In the event that the substrate material includes a binder material that is a Group VIII element, it is additionally desired that the intermediate material operate as a barrier to prevent or minimize the migration of the substrate binder material into the diamond body during the attachment process. Suitable intermediate materials include those described above as being useful as the replacement material, e.g., can be a noncatalyzing material, and/or can have a melting temperature that is below the melting temperature of any binder material in the substrate. Suitable intermediate materials can be cermet materials comprising a noncatalyzing material such as WC—Cu, WC—Cu alloy, or the like.

Although the interface between the diamond body and the substrate illustrated in FIG. 2H are shown as having a planar geometry, it is understood that this interface can also have a nonplanar geometry, e.g., having a convex configuration, a concave configuration, or having one or more surface features that project from one or both of the diamond body and substrate. Such a nonplanar interface may be desired for the purpose of enhancing the surface area of contact between the attached diamond body and substrate, and/or for the purpose of enhancing heat transfer therebetween, and/or for the purpose of reducing the degree of residual stress imposed on the diamond body. Additionally, the diamond body surfaces can be configured differently than that illustrated in FIGS. 2A to 2H, having a planar or nonplanar geometry.

Further, polycrystalline diamond constructions of this invention may comprise a diamond body having properties of diamond density and/or diamond grain size that change as a function of position within the diamond body. For example, the diamond body may have a diamond density and/or a diamond grain size that changes in a gradient or step-wise fashion moving away from a working surface of the diamond body. Further, rather than being formed as a single mass, the diamond body used in forming polycrystalline diamond constructions of this invention can be provided in the form of a composite construction formed from a number of diamond bodies that have been combined together, wherein each such body can have the same or different properties such as diamond grain size, diamond density, or the like.

Polycrystalline diamond constructions of this invention display marked improvements in thermal stability and thus service life when compared to conventional PCD materials that comprise the catalyst material used to initially form the same. Polycrystalline diamond constructions of this invention can be used to form wear and/or cutting elements in a number of different applications such as the automotive industry, the oil and gas industry, the aerospace industry, the nuclear industry, and the transportation industry to name a few. Polycrystalline diamond constructions of this invention are well suited for use as wear and/or cutting elements that are used in the oil and gas industry in such application as on drill bits used for drilling subterranean formations.

FIG. 4 illustrates an embodiment of a polycrystalline diamond compact construction of this invention provided in the form of an insert 70 used in a wear or cutting application in a roller cone drill bit or percussion or hammer drill bit used for subterranean drilling. For example, such inserts 70 can be formed from blanks comprising a substrate 72 formed from one or more of the substrate materials 73 disclosed above, and a diamond body 74 having a working surface 76 comprising a material microstructure made up of the polycrystalline diamond matrix phase, a first region comprising the infiltrant material, and a second region that is substantially free of the infiltrant material, wherein the first and second regions are positioned within the interstitial regions of the matrix phase. The blanks are pressed or machined to the desired shape of a roller cone rock bit insert.

Although the insert in FIG. 4 is illustrated having a generally cylindrical configuration with a rounded or radiused working surface, it is to be understood that inserts formed from polycrystalline constructions of this invention configured other than as illustrated and such alternative configurations are understood to be within the scope of this invention.

FIG. 5 illustrates a rotary or roller cone drill bit in the form of a rock bit 78 comprising a number of the wear or cutting inserts 70 disclosed above and illustrated in FIG. 4. The rock bit 78 comprises a body 80 having three legs 82, and a roller cutter cone 84 mounted on a lower end of each leg. The inserts 70 can be fabricated according to the method described above. The inserts 70 are provided in the surfaces of each cutter cone 84 for bearing on a rock formation being drilled.

FIG. 6 illustrates the inserts 70 described above as used with a percussion or hammer bit 86. The hammer bit comprises a hollow steel body 88 having a threaded pin 90 on an end of the body for assembling the bit onto a drill string (not shown) for drilling oil wells and the like. A plurality of the inserts 70 is provided in the surface of a head 92 of the body 88 for bearing on the subterranean formation being drilled.

Figure 7:
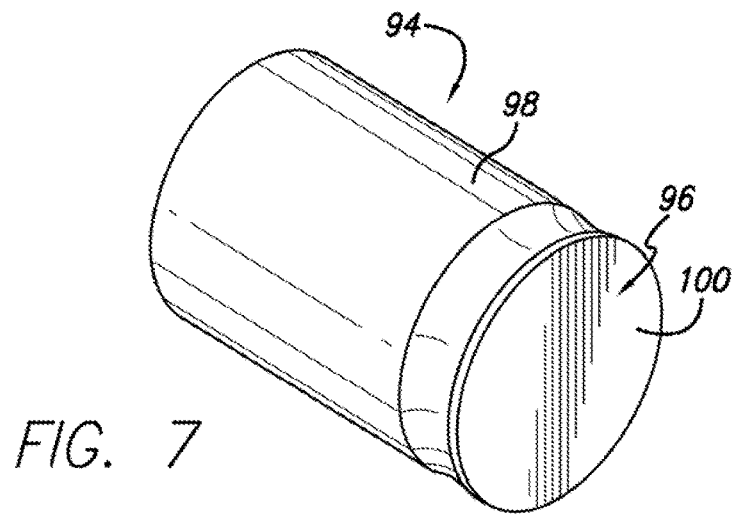
FIG. 7 is a schematic perspective side view of a diamond shear cutter comprising the polycrystalline diamond constructions of this invention.

FIG. 7 illustrates a polycrystalline construction compact of this invention embodied in the form of a shear cutter 94 used, for example, with a drag bit for drilling subterranean formations. The shear cutter 94 comprises a diamond body 96, comprising the polycrystalline diamond matrix phase, a first phase comprising the infiltrant material, and a second phase that is substantially free of the infiltrant material, wherein the first and second phases are positioned within the interstitial regions of the matrix. The body is attached to a cutter substrate 98. The PCD body 96 includes a working or cutting surface 100.

Although the shear cutter in FIG. 7 is illustrated having a generally cylindrical configuration with a flat working surface that is disposed perpendicular to an axis running through the shear cutter, it is to be understood that shear cutters formed from polycrystalline diamond constructions of this invention can be configured other than as illustrated and such alternative configurations are understood to be within the scope of this invention.

Figure 8:
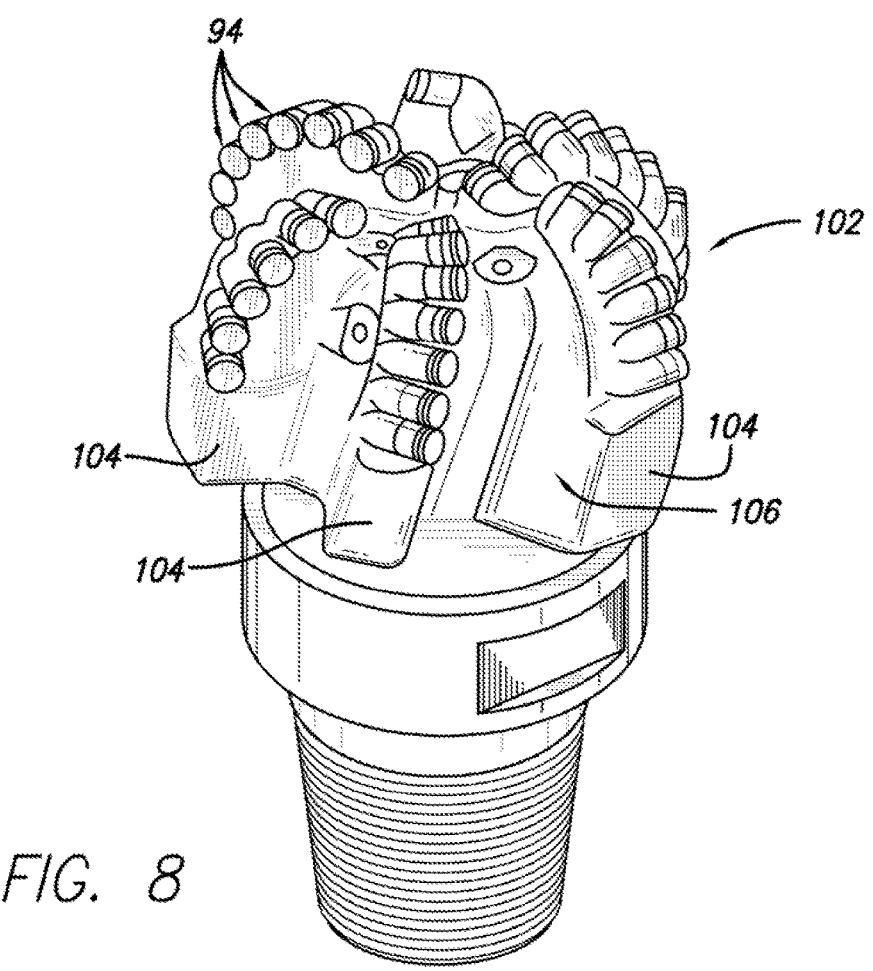
FIG. 8 is a perspective side view of a drag bit comprising a number of the shear cutters of FIG. 7.

FIG. 8 illustrates a drag bit 102 comprising a plurality of the shear cutters 94 described above and illustrated in FIG. 7. The shear cutters are each attached to blades 104 that each extend from a head 106 of the drag bit for cutting against the subterranean formation being drilled.

Other modifications and variations of polycrystalline diamond bodies, constructions, compacts, and methods of forming the same according to the principles of this invention will be apparent to those skilled in the art. For example, prior to the step of introducing the infiltrant material into the diamond body, it may be desirable to introduce another material, e.g., a replacement material into the diamond body. The replacement material is different from the infiltrant material and can be selected to contribute one or more desired properties to the resulting polycrystalline diamond body. The replacement material can be introduced by the same techniques noted above for introducing the infiltrant material, and can fully or partially densify the diamond body, and can extend through the body to a working surface, depending on the particular end-use application. Example replacement materials include non-refractory metals, ceramics, silicon and silicon-containing compounds, ultra-hard materials such as diamond and cBN, and mixtures thereof.

In the event that such replacement material is introduced in the diamond body, in addition to the infiltrant material, the resulting diamond body may include different regions characterized by having the replacement material and/or the infiltrant material disposed within the voids or pores. During the subsequent step of removing a portion of the infiltrant material from the diamond body, some or all of the replacement material may also be removed.

It is, therefore, to be understood that within the scope of the appended claims, this invention may be practiced otherwise than as specifically described.

What is claimed is:

1. A method for making a polycrystalline diamond construction comprising the steps of:
    subjecting diamond grains to a high pressure/high temperature condition in the presence of a catalyst material to form a polycrystalline diamond material comprising a matrix phase of bonded together diamond grains and interstitial regions disposed between the diamond grains including the catalyst material;
    treating the polycrystalline diamond material to remove the catalyst material therefrom to form a diamond body that is substantially free of the catalyst material used to initially form the polycrystalline diamond material;
    introducing a single infiltrant material into the diamond body, wherein the infiltrant material fills a population of the interstitial regions; and
    attaching a substrate to the diamond body;
    wherein after the step of introducing, a region of the diamond body extending a depth from a surface of the diamond body is substantially free of the infiltrant, and wherein the depth ranges from about 0.05 mm to about 0.5 mm.

2. The method as recited in claim 1 wherein during the step of subjecting, a first substrate is used as a source to introduce the catalyst material during the high pressure/high temperature condition.

3. The method as recited in claim 2 wherein during the step of attaching, a second substrate having a material makeup different than the first substrate is used.

4. The method as recited in claim 1 wherein during the step of introducing, the infiltrant material consists of metals from Group VIII of the Periodic table or alloys consisting of metals from Group VIII of the Periodic table.

5. The method as recited in claim 1 comprising, after the step of introducing, treating the diamond body to remove the infiltrant material from a region of the diamond body adjacent the surface.

6. The method as recited in claim 1 wherein the diamond region substantially free of the infiltrant material extends a depth from the diamond body surface including one or both of a top and side surface.

7. The method as recited in claim 1 wherein the step of treating comprises using a leaching agent and is selected from the group of techniques consisting of using elevated temperature, using elevated pressure, using ultrasonic energy, and combinations thereof.

8. The method as recited in claim 1 wherein the step of attaching is performed by subjecting the diamond body and substrate to high pressure/high temperature conditions.

9. The method as recited in claim 8 wherein the substrate is the source of the infiltrant and during the step of introducing the diamond body and substrate are subjected to high pressure/high temperature conditions.

10. A method for making a polycrystalline diamond construction comprising the steps of:

forming a sintered polycrystalline diamond material comprising a matrix phase of bonded together diamond grains by subjecting a plurality of diamond grains to a high pressure/high temperature condition in the presence of a catalyst material;

treating the sintered polycrystalline material to remove the catalyst material therefrom to form a diamond body that is substantially free of the catalyst material used to form the initially sintered polycrystalline diamond material;

introducing an infiltrant material into the diamond body, the infiltrant material being one or more metals selected from Group VIII of the Periodic table; and treating the diamond body to remove a portion of the infiltrant material from a region extending a depth from a working surface of the body, wherein the infiltrant material remains in another region of the body, and wherein the depth ranges from about 0.05 mm to about 0.5 mm.

11. The method as recited in claim 10 wherein during the step of forming, the catalyst material is provided by a substrate material that is positioned adjacent the plurality of diamond grains.

12. The method as recited in claim 11 wherein during the step of forming, the substrate is attached to the polycrystalline diamond material.

13. The method as recited in claim 11 wherein before the step of treating the diamond body to remove a portion of the infiltrant material, a substrate material different from the substrate material used during the step of forming is attached to the diamond body.

14. The method as recited in claim 10 wherein during the step of introducing, the diamond body is subjected to a high temperature/high pressure process.

15. The method as recited in claim 14 wherein a substrate is attached to the diamond body during the step of introducing.

16. The method of claim 1, wherein the diamond body has a concave surface, and wherein the substrate interfaces the concave surface during attachment.

17. The method of claim 1, wherein the introducing and attaching occur in a single sintering process.

18. The method of claim 17, wherein an increase in temperature follows an increase in pressure.

19. The method of claim 1, wherein an intermediate layer is placed between the diamond body and the substrate during the attachment.

20. The method of claim 1, wherein the catalyst material is cobalt and wherein the infiltrant material is selected from nickel, iron, or alloys of Group VIII metals.

21. The method of claim 1, wherein the catalyst material is nickel, and wherein the infiltrant material is selected from cobalt, iron, or alloys of Group VIII metals.

22. The method of claim 1, wherein the catalyst material is iron, and wherein the infiltrant material is selected from cobalt, nickel, or alloys of Group VIII metals.

23. The method of claim 1, wherein the catalyst material is an alloy of Group VIII metals, and wherein the infiltrant material is selected from cobalt, nickel, or iron.

24. A method for making a polycrystalline diamond construction comprising the steps of:
subjecting diamond grains to a high pressure/high temperature condition in the presence of a catalyst material to form a polycrystalline diamond material comprising a matrix phase of bonded together diamond grains and interstitial regions disposed between the diamond grains including the catalyst material;

treating the polycrystalline diamond material to remove the catalyst material therefrom to form a diamond body that is substantially free of the catalyst material used to initially form the polycrystalline diamond material;

after treating the polycrystalline diamond material to remove the catalyst material, controllably introducing non-catalyst infiltrant material into only a targeted portion of the diamond body, wherein the infiltrant material fills a population of the interstitial regions in the targeted portion of the diamond body, wherein controllably introducing the infiltrant material includes substantially filling all voids within the diamond body with the infiltrant material and removing a portion of the infiltrant material and thereby leaving the infiltrant material in only the targeted portion of the diamond body; and attaching a substrate to the diamond body.

25. The method of claim 24, wherein the diamond body has a concave surface, and wherein the substrate interfaces the concave surface during attachment.

26. The method of claim 24, wherein the introducing and attaching occur in a single sintering process.

27. The method of claim 26, wherein an increase in temperature follows an increase in pressure.

28. The method of claim 24, wherein an intermediate layer is placed between the diamond body and the substrate during the attachment.

29. The method of claim 24, wherein the catalyst material is cobalt and wherein the infiltrant material is selected from nickel, iron, or alloys of Group VIII metals.

30. The method of claim 24, wherein the catalyst material is nickel, and wherein the infiltrant material is selected from cobalt, iron, or alloys of Group VIII metals.

31. The method of claim 24, wherein the catalyst material is iron, and wherein the infiltrant material is selected from cobalt, nickel, or alloys of Group VIII metals.

32. The method of claim 24, wherein the catalyst material is an alloy of Group VIII metals, and wherein the infiltrant material is selected from cobalt, nickel, or iron.

33. The method as recited in claim 24 wherein during the step of subjecting, a first substrate is used as a source to introduce the catalyst material during the high pressure/high temperature condition.

34. The method as recited in claim 33 wherein during the step of attaching, a second substrate having a material makeup different than the first substrate is used.

35. The method as recited in claim 24 wherein during the step of introducing, the infiltrant material consists of metals from Group VIII of the Periodic table or alloys consisting of metals from Group VIII of the Periodic table.

36. The method as recited in claim 24 wherein removing the portion of the infiltrant material and thereby leaving the infiltrant material in only the targeted portion of the diamond body includes removing the infiltrant material a depth from the diamond body surface including one or both of a top and side surface.

37. The method as recited in claim 24 wherein the step of treating comprises using a leaching agent and is selected from the group of techniques consisting of using elevated temperature, using elevated pressure, using ultrasonic energy, and combinations thereof.

38. The method as recited in claim 24 wherein the step of attaching is performed by subjecting the diamond body and substrate to high pressure/high temperature conditions.

39. The method as recited in claim 38 wherein the substrate is the source of the infiltrant and during the step of introducing the diamond body and substrate are subjected to high pressure/high temperature conditions.

40. The method of claim 10, wherein the diamond body has a concave surface, and wherein the substrate interfaces the concave surface during attachment.

41. The method of claim 10, wherein the introducing and attaching occur in a single sintering process.

42. The method of claim 41, wherein an increase in temperature follows an increase in pressure.

43. The method of claim 10, wherein an intermediate layer is placed between the diamond body and the substrate during the attachment.

44. The method of claim 10, wherein the catalyst material is cobalt and wherein the infiltrant material is selected from nickel, iron, or alloys of Group VIII metals.

45. The method of claim 10, wherein the catalyst material is nickel, and wherein the infiltrant material is selected from cobalt, iron, or alloys of Group VIII metals.

46. The method of claim 10, wherein the catalyst material is iron, and wherein the infiltrant material is selected from cobalt, nickel, or alloys of Group VIII metals.

47. The method of claim 10, wherein the catalyst material is an alloy of Group VIII metals, and wherein the infiltrant material is selected from cobalt, nickel, or iron.

48. The method of claim 1, wherein after the step of treating, further comprising introducing a replacement material into the diamond body, wherein the replacement material is different from the infiltrant material.

49. The method of claim 10, wherein after the step of treating, further comprising introducing a replacement material into the diamond body, wherein the replacement material is different from the infiltrant material.

50. The method of claim 24, wherein after the step of treating and before controllably introducing infiltrant material, further comprising introducing a replacement material into the diamond body, wherein the replacement material is different from the infiltrant material.

51. A method for making a polycrystalline diamond construction comprising the steps of:
   subjecting diamond grains to a high pressure/high temperature condition in the presence of a catalyst material to form a polycrystalline diamond material comprising a matrix phase of bonded together diamond grains and interstitial regions disposed between the diamond grains including the catalyst material;
   treating the polycrystalline diamond material to remove the catalyst material therefrom to form a diamond body that is substantially free of the catalyst material used to initially form the polycrystalline diamond material;
   after treating the polycrystalline diamond to remove the catalyst material, introducing a replacement material into the diamond body, wherein the replacement material fills the interstitial regions in at least a portion of the diamond body, the replacement material being selected from the group consisting of ceramics, silicon and silicon-containing compounds, ultra-hard materials, and mixtures thereof;
   after introducing the replacement material into the diamond body, introducing an infiltrant material into the diamond body, wherein the infiltrant material is different from the replacement material; and
   attaching a substrate to the diamond body;
   wherein after the steps of introducing the replacement material and the infiltrant material, a region of the diamond body extending a depth from a surface of the diamond body is substantially free of the infiltrant material.

52. The method as recited in claim 51, wherein during the step of introducing the infiltrant, the infiltrant material consists of metals from Group VIII of the Periodic table or alloys consisting of metals from Group VIII of the Periodic table.

53. The method as recited in claim 51, comprising, after the steps of introducing the replacement material and the infiltrant, treating the diamond body to remove the replacement material and the infiltrant material from a region of the diamond body adjacent the surface.

54. The method as recited in claim 51, wherein the infiltrant material is introduced into another portion of the diamond body that is different from the portion of the diamond body having the introduced replacement material.

55. The method as recited in claim 51, wherein the infiltrant material is introduced into the same portion of the diamond body having the introduced replacement material.

* * * * *